United States Patent
Song et al.

(10) Patent No.: US 6,476,898 B2
(45) Date of Patent: Nov. 5, 2002

(54) OPTICALLY COMPENSATED BEND LIQUID CRYSTAL DISPLAY WITH CONTROLLING APERTURES AND BUFFER ELECTRODES

(75) Inventors: Jang-Kun Song, Seoul; Jae-Jin Lyu, Kyungki-do; Chang-Hun Lee, Suwon; Sahng-Ik Jun, Yongin, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/838,383

(22) Filed: Apr. 20, 2001

(65) Prior Publication Data

US 2001/0050744 A1 Dec. 13, 2001

(30) Foreign Application Priority Data

Apr. 20, 2000 (KR) ........................................ 2000-21077

(51) Int. Cl.[7] ............................................. G02F 1/1343
(52) U.S. Cl. ........................................ 349/139; 349/147
(58) Field of Search ................................ 349/182, 123, 349/110, 111, 38, 39, 143, 139; 252/299.01; 257/72, 40, 79, 83, 88; 427/533, 555, 552, 162

(56) References Cited

U.S. PATENT DOCUMENTS 5,855,986 A * 1/1999 Hirata et al. ................. 427/533
6,040,890 A * 3/2000 Sawada et al. .............. 349/182
6,271,543 B1 * 8/2001 Ohtani et al. ................. 257/72

* cited by examiner

Primary Examiner—Toan Ton
Assistant Examiner—T L Rude
(74) Attorney, Agent, or Firm—McGuireWoods LLP; Hae-Chan Park

(57) ABSTRACT

A liquid crystal display in which liquid crystal molecules of the liquid crystal display have a uniformly bent alignment. The liquid crystal display includes a first substrate including wiring that intersects to define unit pixels, and a first electrode provided in each of the unit pixels; a second substrate opposing the first substrate and including a second electrode formed over an entire area of the second substrate, the first and second electrodes forming an electric field when a voltage is applied to the first and second electrodes; a liquid crystal layer formed by injecting liquid crystal material between the first and second substrates, the liquid crystal material having liquid crystal molecules that are horizontally oriented in one direction and increasingly bent as approaching an imaginary center plane, wherein the center plane is parallel and equidistant to the first and second substrates, when the electric field is formed between the first and second substrates, such that the liquid crystal molecules are symmetrical about the center plane; and a buffer electrode provided under the first electrode and extending past an edge of the first electrode at an area where orientation of the liquid crystal molecules begins in the unit pixel.

28 Claims, 18 Drawing Sheets ical crystal display, and more particularly, to a liquid crystal display having a wide viewing angle and a fast response speed, and in which liquid crystal molecules of the liquid crystal display have a uniformly bent alignment.

OPTICALLY COMPENSATED BEND LIQUID CRYSTAL DISPLAY WITH CONTROLLING APERTURES AND BUFFER ELECTRODES

BACKGROUND OF THE INVENTION (a) Field of the Invention

The present invention relates to a liquid crystal display, and more particularly, to a liquid crystal display having a wide viewing angle and a fast response speed, and in which liquid crystal molecules of the liquid crystal display have a uniformly bent alignment.

(b) Description of the Related Art

The liquid crystal display (LCD) is structured having liquid crystal material injected between two substrates. A voltage of a different potential is applied to electrodes of the substrates to form an electric field such that the alignment of liquid crystal molecules of the liquid crystal material is varied. Accordingly, the transmittance of incident light is controlled to enable the display of images.

Various LCD configurations have been developed to increase the response speed and viewing angle of such LCDs. Examples include the HAN (hybrid aligned nematic) LCD and the OCB (optically compensated bend) LCD. The OCB liquid crystal display includes an electrode on each substrate, the electrodes forming an electric field between the substrates where the substrates are perpendicular to the electric field; a liquid crystal layer formed by injecting liquid crystal material between the substrates; and an orientation layer formed on each substrate, the orientation layer aligning liquid crystal molecules of the liquid crystal layer in the same direction, substantially parallel to the substrates.

In such an OCB LCD, the liquid crystal molecules are aligned symmetrically about an imaginary center plane that is parallel and equidistant to the two substrates. In particular, the liquid crystal molecules are substantially parallel to the substrates at areas adjacent to the substrates, then they increasingly bend to a vertical position in a direction toward the imaginary center plane, at which point the liquid crystal molecules are substantially perpendicular to the substrates. Such an alignment is obtained through the combination of the orientation layers, which align the liquid crystal molecules parallel to the substrates, and the generated electric field, which provides a force to align the liquid crystal molecules perpendicular to the substrates. Because the liquid crystal molecules move in the same direction when driving the OCB LCD, a wide viewing angle and a fast response speed are achieved.

However, a serious drawback of the OCB LCD is that a broken or non-uniform alignment of the liquid crystal molecules results at areas where orientation begins at unit pixels, thereby reducing overall picture quality. That is, a bent electric field is formed at edges of pixel electrodes, the bent electric fields being formed in each unit pixel that is slightly separated from the next. At the areas where alignment begins in each unit pixel, the direction of this bent electric field and the direction of the bent alignment of the liquid crystal molecules are in opposing directions, resulting in the broken alignment of the liquid crystal molecules in these locations.

SUMMARY OF THE INVENTION

The present invention has been made in an effort to solve the above problems.

It is an object of the present invention to provide a liquid crystal display having a wide viewing angle and fast response speed, and in which liquid crystal molecules of the liquid crystal display have a uniformly bent alignment.

To achieve the above object, the present invention provides a liquid crystal display comprising a first substrate including wiring that intersects to define unit pixels, and a first electrode provided in each unit pixel; a second substrate opposing the first substrate and including a second electrode formed over an entire area of the second substrate, the first and second electrodes forming an electric field when a voltage is applied to the first and second electrodes; a liquid crystal formed by injecting liquid crystal material between the first and second substrates, the liquid crystal material being comprised of liquid crystal molecules that are horizontally oriented in one direction and increasingly bent as approaching an imaginary center plane, which is parallel and equidistant to the first and second substrates, when the electric field is formed between the first and second substrates, thereby being symmetrical about the center plane; and a buffer electrode provided under the first electrode and extending past an edge of the same at an area where orientation of the liquid crystal molecules begins in the unit pixel.

According to a feature of the present invention, the wiring includes gate lines for transmitting gate signals and data lines for transmitting image signals, where the data lines cross the gate lines.

According to another feature of the present invention, the first substrate further includes thin film transistors formed at regions where the gate lines and the data lines cross, the thin film transistors having gate electrodes connected to the gate lines, source electrodes connected to the data lines, drain electrodes provided opposite the source electrodes with reference to the gate electrodes, and a semiconductor layer.

According to yet another feature of the present invention, the buffer electrode is formed on a same layer as the wiring.

According to still yet another feature of the present invention, the buffer electrode is electrically connected to the first electrode.

According to still yet another feature of the present invention, the buffer electrode is formed in line with the wiring.

In another aspect, the present invention provides a liquid crystal display comprising a first substrate including wiring that intersects to define unit pixels, and a first electrode provided in each unit pixel; a second substrate opposing the first substrate and including a second electrode formed over an entire area of the second substrate, the first and second electrodes forming an electric field when a voltage is applied to the first and second electrodes; and a liquid crystal layer formed by injecting liquid crystal material between the first and second substrates, the liquid crystal material being comprised of liquid crystal molecules that are horizontally oriented in one direction and increasingly bent as approaching an imaginary center plane, wherein the center plane is parallel and equidistant to the first and second substrates, when the electric field is formed between the first and second substrates, thereby being symmetrical about the center plane, wherein an aperture is formed in either the first electrode or the second electrode in an area where orientation of the liquid crystal molecules begins in the unit pixels.

According to a feature of the present invention, there is further provided a buffer electrode under the first electrode and extending past an edge of the first electrode at an area where orientation of the liquid crystal molecules begins in the unit pixel.

According to another feature of the present invention, the edge of the first electrode under which the buffer electrode is provided is the edge closest to a center of the second electrode.

According to yet another feature of the present invention, the aperture and the buffer electrode are formed in line with the wiring.

According to still yet another feature of the present invention, the wiring includes gate lines for transmitting gate signals and data lines for transmitting image signals, where the data lines cross the gate lines.

According to still yet another feature of the present invention, the first substrate further includes thin film transistors formed at regions where the gate lines and the data lines cross, the thin film transistors having gate electrodes connected to the gate lines, source electrodes connected to the data lines, drain electrodes provided opposite the source electrodes with reference to the gate electrodes, and a semiconductor layer.

According to still yet another feature of the present invention, the buffer electrode is formed on a same layer as the wiring.

According to still yet another feature of the present invention, the buffer electrode is electrically connected to the first electrode.

According to still yet another feature of the present invention, if the aperture is formed in the second electrode, an edge of the aperture closest to the center of the unit pixel is provided over the first electrode.

In yet another aspect, the present invention provides a liquid crystal display comprising a first substrate including wiring that intersects to define unit pixels, and a first electrode provided in each unit pixel; a second substrate opposing the first substrate and including a second electrode formed over an entire area of the second substrate, the first and second electrodes forming an electric field when a voltage is applied to the first and second electrodes, and also including a black matrix formed in the unit pixel and having an aperture; and a liquid crystal layer realized through liquid crystal material injected between the first and second substrates, the liquid crystal material being comprised of liquid crystal molecules that are horizontally oriented in one direction and increasingly bent as approaching an imaginary center plane, which is parallel and equidistant to the first and second substrates, when the electric field is formed between the first and second substrates, thereby being symmetrical about the center plane, wherein a pretilt angle of the liquid crystal molecules is different in a first region corresponding to the unit pixel and a second region corresponding to the wiring or the black matrix.

According to a feature of the present invention, the pretilt angle of the first region is smaller than the pretilt angle of the second region.

A method for manufacturing a liquid crystal display comprises the steps of producing a first substrate including wiring that intersects to define unit pixels, and a first electrode provided in each unit pixel; producing a second substrate including a second electrode formed over an entire area of the second substrate, the first and second electrodes forming an electric field when a voltage is applied to the first and second electrodes, and also including a black matrix formed in the unit pixel and having an aperture; performing a first orientation process in the same direction on the first and second substrates such that liquid crystal molecules of liquid crystal material to be provided between the substrates have a particular pretilt angle; aligning and connecting the first and second substrates such that a predetermined gap is formed therebetween; and performing a second orientation process such that the liquid crystal molecules have a different pretilt angle in a first region corresponding to the wiring or black matrix and in a second region corresponding to the unit pixel.

According to a feature of the present invention, the second orientation process is performed by irradiating light while using the wiring or black matrix as a mask.

According to another feature of the present invention, the pretilt angle of the second region is smaller than the pretilt angle of the first region.

In still yet another aspect, the present invention provides a liquid crystal display comprising a first substrate including wiring that intersects to define unit pixels, and a first electrode provided in each unit pixel; a second substrate opposing the first substrate and including a second electrode formed over an entire area of the second substrate, the first and second electrodes forming an electric field when a voltage is applied to the same; and a liquid crystal layer realized through liquid crystal material injected between the first and second substrates, the liquid crystal material being comprised of liquid crystal molecules that are horizontally oriented in one direction and increasingly bent as approaching an imaginary center plane, which is parallel and equidistant to the first and second substrates, when the electric field is formed between the first and second substrates, thereby being symmetrical about the center plane, wherein a pretilt angle of the liquid crystal molecules is in the range of 10–25°.

According to a feature of the present invention, the liquid crystal display further comprises a protrusion pattern in each unit pixel covering an edge of the first electrode where orientation of the liquid crystal molecules starts.

According to another feature of the present invention, the protrusion pattern has an anisotropy of between 3 and 7.

According to yet another feature of the present invention, the wiring includes gate lines for transmitting gate signals and data lines for transmitting image signals, where the data lines cross the gate lines.

According to still yet another feature of the present invention, an orientation direction of the liquid crystal molecules is parallel to the data lines or the gate lines.

According to still yet another feature of the present invention, the liquid crystal display further comprises a layer for blocking light, the layer being formed under the first electrode where orientation of the liquid crystal molecules starts in the unit pixels.

According to still yet another feature of the present invention, the layer for blocking light is formed on a same layer as the gate lines.

According to still yet another feature of the present invention, the layer for blocking light overlaps the first electrode to form a storage capacitance.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

In the present invention, to stabilize a bent alignment of liquid crystal molecules, either apertures are formed in pixel electrodes at areas where orientation begins in each unit pixel, or an electrode is formed to reduce the strength of a bent fringe field, which is formed in a direction opposite to the bent alignment of the liquid crystal molecules. However, the structure of a liquid crystal display having a bent alignment of liquid crystal molecules and the problem of a broken (or non-uniform) alignment will first be described. All the drawings are partial views and it is to be assumed that the structures to be described continue throughout the liquid crystal display.

Figure 1:
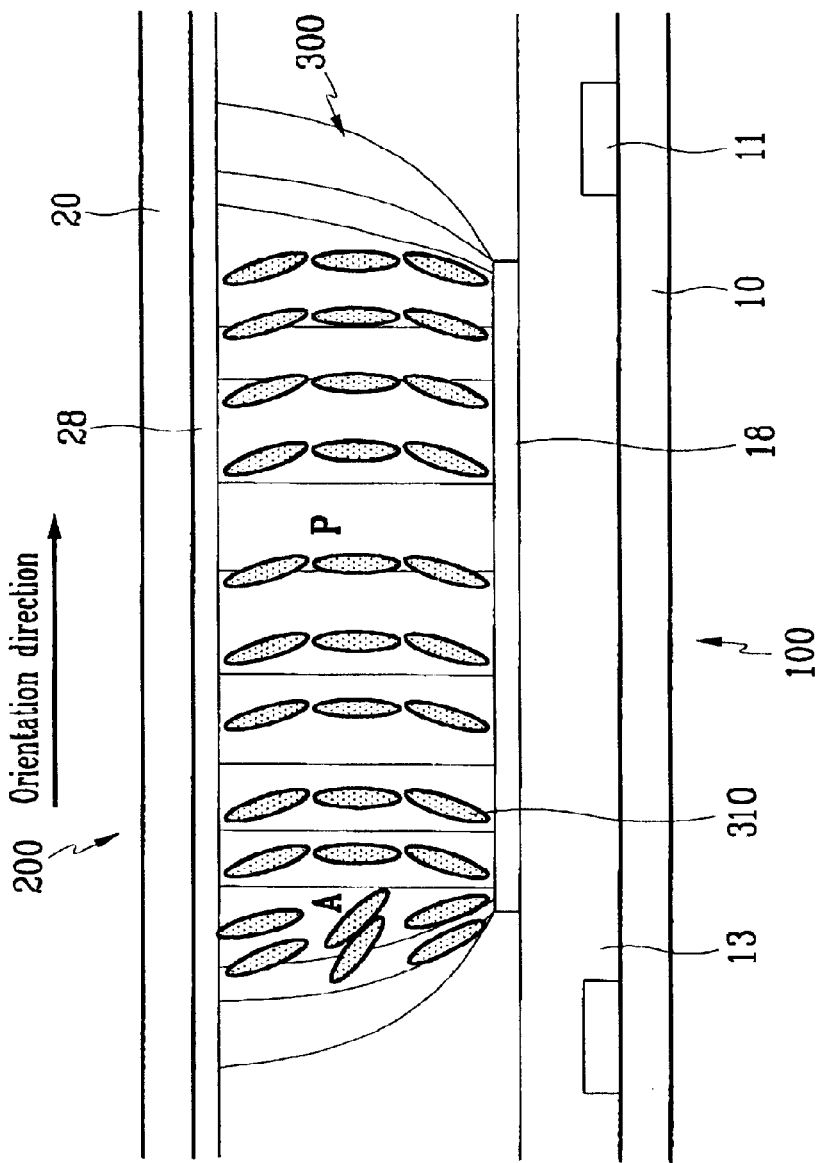
FIG. 1 is a schematic sectional view of a conventional liquid crystal display having a bent alignment of liquid crystal molecules.

FIG. 1 is a schematic sectional view of a liquid crystal display having a bent alignment of liquid crystal molecules.

A liquid crystal display having a bent alignment of liquid crystal molecules includes a lower substrate unit 100 and an upper substrate unit 200 provided substantially in parallel at a predetermined distance, and a liquid crystal layer 300 formed by injecting liquid crystal material between the substrate units 100 and 200 and comprised of liquid crystal molecules 310, the liquid crystal molecules 310 being perpendicularly oriented with respect to the substrate units 100 and 200.

The lower substrate unit 100 includes a transparent, insulating lower substrate 10. Wiring 11, including data lines and gate lines, is formed on the lower substrate 10. The wiring 11 defines unit pixels P on the lower substrate unit 100 and transmits image signals and scanning signals. An insulating layer 13 is formed on the lower substrate 10 and a pixel electrode 18, which transmits image signals, is formed on the insulating layer 13. The upper substrate unit 200 includes an insulating upper substrate 20. A common electrode 28 is formed over an entire inner surface of the upper substrate 20. With the application of a voltage of a different potential to the common electrode 28 and the pixel electrode 18, an electric field is generated between the substrates 10 and 20 to drive the liquid crystal molecules 310.

An orientation layer (not shown) is formed on an inner surface of each substrate 10 and 20. The orientation layers provide an orientation force to the liquid crystal molecules 310 for aligning the same in a direction parallel to the substrates 10 and 20. It is to be noted here that the liquid crystal layer 300 has a positive dielectric anisotropy.

In a state where a critical voltage is applied to the pixel electrode 18 and the common electrode 28, the liquid crystal molecules 310 of the liquid crystal layer 300 adjacent to the substrates 10 and 20 are aligned having a pretilt angle with respect to the substrates 10 and 20. The pretilt angle is determined by the orienting force of the orientation layers and characteristics of the liquid crystal molecules 310. However, as approaching an imaginary center plane, which is parallel and equidistant to the substrates 10 and 20, the liquid crystal molecules 310 are increasingly bent as a result of the electric field formed between the substrates 10 and 20 and the decreasing influence of the orienting force of the orientation layers until becoming substantially perpendicular to the substrates 10 and 20 at the center plane. Accordingly, the liquid crystal molecules 310 form two symmetrical regions about the center plane to compensate for a phase retardation of light passing through the liquid crystal layer 300. A wide viewing angle is obtained as a result.

At edges of the pixel electrode 18 patterned in the unit pixel P, there is formed a fringe field. As a result, at an area A where orientation of the liquid crystal molecules 310 begins, the bent alignment direction of the liquid crystal molecules 310 and the bent direction of the generated electric field are in opposing directions, resulting in a broken alignment of the liquid crystal molecules 310.

Varying forms of the broken bent alignment of the liquid crystal molecules 310 and degrees of severity in the alignment, as different voltages are applied, will now be described.

Figure 2:
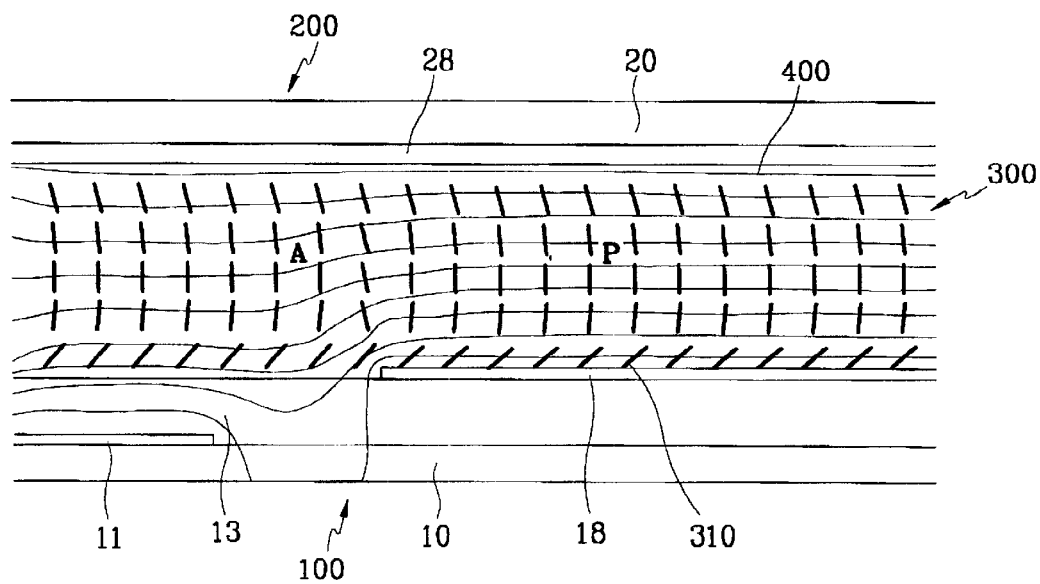
FIG. 2 is a schematic sectional view of a conventional liquid crystal display having a bent alignment of liquid crystal molecules, in which a broken alignment of the liquid crystal molecules is illustrated at a first application of voltage.
Figure 3:
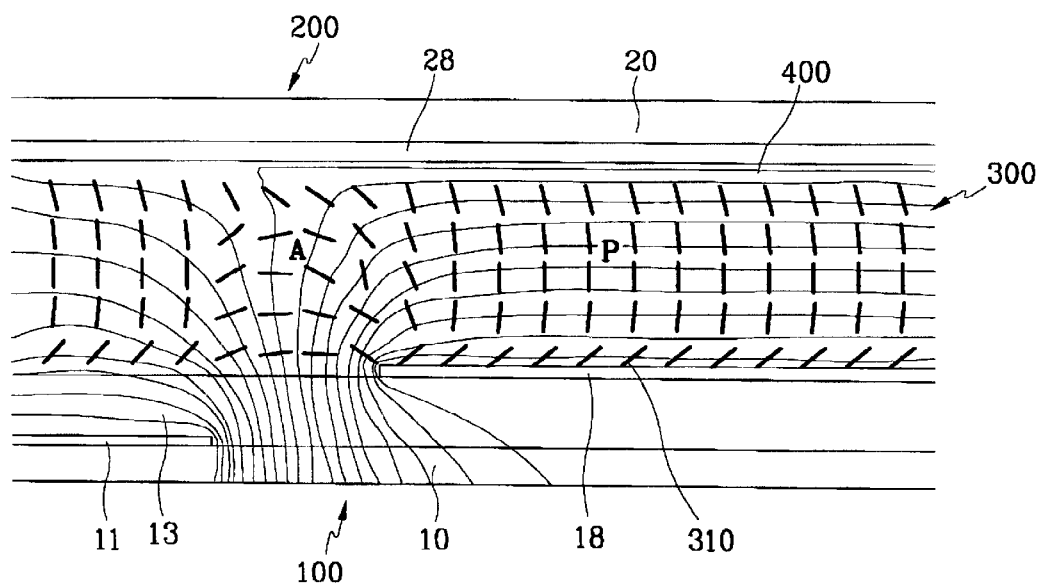
FIG. 3 is a schematic sectional view of a conventional liquid crystal display having a bent alignment of liquid crystal molecules, in which a broken alignment of the liquid crystal molecules is illustrated at a second application of voltage.
Figure 4:
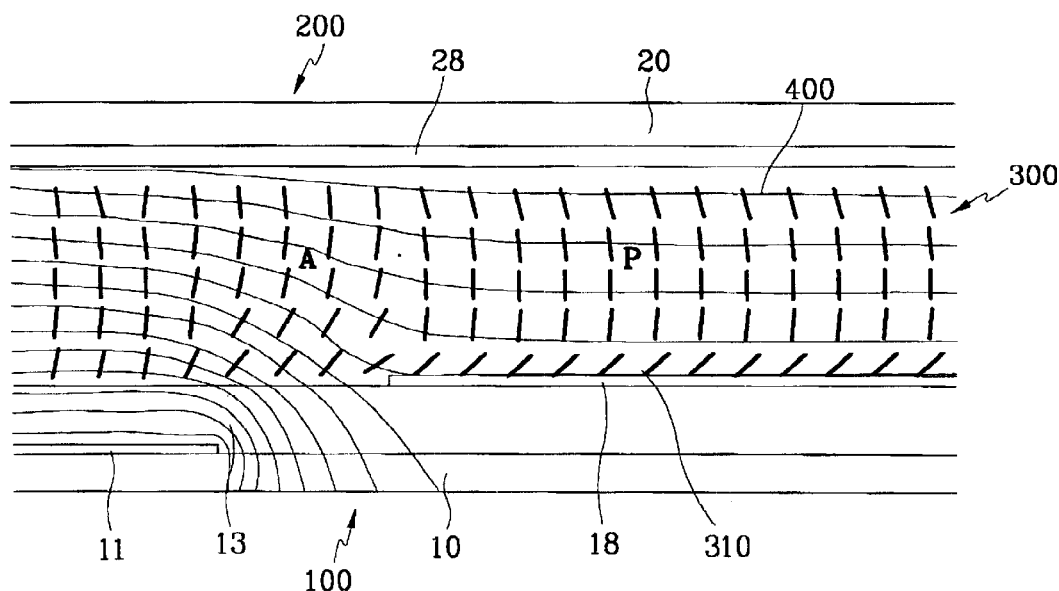
FIG. 4 is a schematic sectional view of a conventional liquid crystal display having a bent alignment of liquid crystal molecules, in which a broken alignment of the liquid crystal molecules is illustrated at a third application of voltage.
Figure 5:
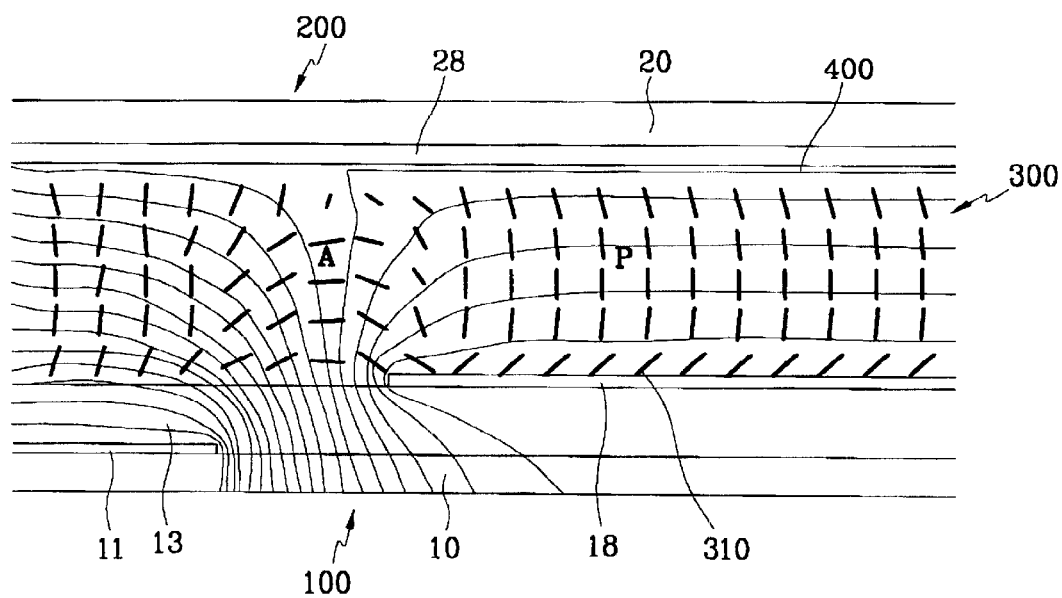
FIG. 5 is a schematic sectional view of a conventional liquid crystal display having a bent alignment of liquid crystal molecules, in which a broken alignment of the liquid crystal molecules is illustrated at a fourth application of voltage.
Figure 6:
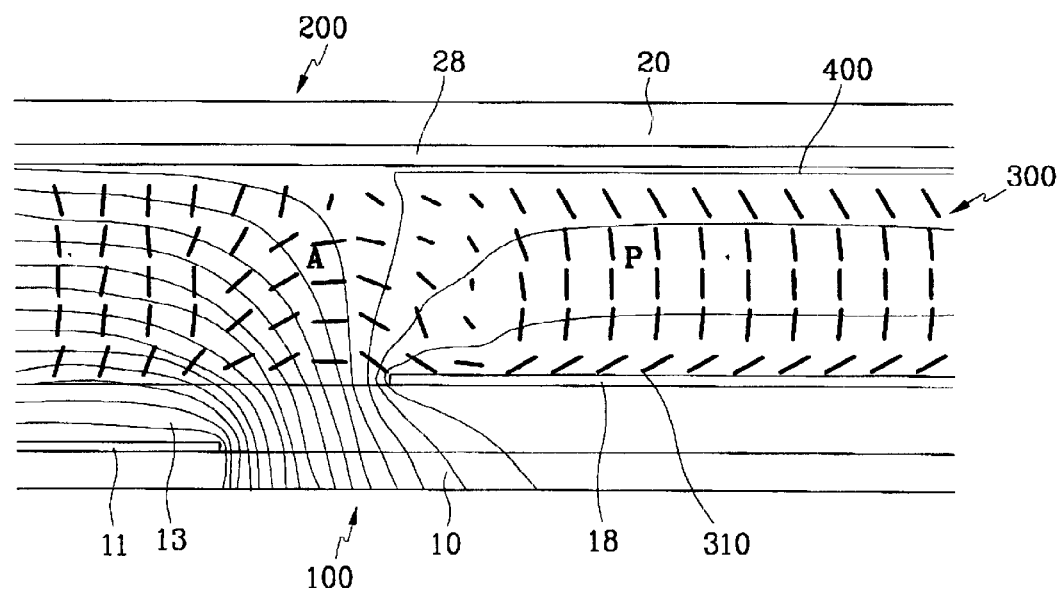
FIG. 6 is a schematic sectional view of a conventional liquid crystal display having a bent alignment of liquid crystal molecules, in which a broken alignment of the liquid crystal molecules is illustrated at a fifth application of voltage.

FIGS. 2, 3, 4, 5, and 6 are schematic sectional views of a liquid crystal display having a bent alignment of liquid crystal molecules, in which a broken alignment of the liquid crystal molecules is illustrated. In the drawings, reference numeral 400 indicates an equipotential surface. FIGS. 2 and 3 illustrate a liquid crystal display in the case where the wiring 11 is a data line for transmitting image signals, and FIGS. 4, 5, and 6 illustrate a liquid crystal display in the case where the wiring is a gate line for transmitting scanning signals. Further, a common voltage applied to the common electrode 28 in FIGS. 2, 3, 4, 5, and 6 is 0V.

Referring first to FIG. 2, in the case where a −5V voltage is applied to both the data line 11 and the pixel electrode 18, since there occurs almost no difference in potential between the data line 11 and the pixel electrode 18, the equipotential surface 400 is formed substantially smooth even in area A. In this case, there occurs no broken bent alignment of the liquid crystal molecules 310. This is the result of applying a voltage of the same intensity and polarity to the data line 11 and the pixel electrode 18 such that a bent electric field is not formed at the edges of the pixel electrode 18.

Referring to FIG. 3, in the case where a −5V voltage is applied to the data line 11 and a +5V voltage is applied to the pixel electrode 18, since a substantial difference in potential is generated between the data line 11 and the pixel electrode 18, the equipotential surface 400 is formed having a sharp decline. A severe break in the bent alignment of the liquid crystal molecules 310 occurs as a result. In this case, although in theory a 10V potential difference is generated between the data line 11 and the pixel electrode 18, in actual operation of the liquid crystal display, a 10–20V potential difference occurs such that an extreme break in the alignment of the liquid crystal molecules 310 results. This also leads to the spreading of the misalignment of the liquid crystal molecules 310 into the area of the pixel P, thereby further negatively affecting display quality.

With reference to FIG. 4, in the case where a −15V voltage is applied to the gate line 11 and a −5V voltage is applied to the pixel electrode 18, because of the use of a voltage having the same polarity as the voltage applied to the common electrode 28, the equipotential surface 400 is formed substantially smooth in area A as in FIG. 2.

In FIG. 5, on the other hand, if the application of voltage to the pixel electrode 18 is changed from −5V to +5V, a substantial potential difference occurs between the gate line 11 and the pixel electrode 18. As a result, as shown in FIG. 5, the equipotential surface 400 is formed with a sharp decline in area A such that a broken bent alignment of the liquid crystal molecules 310 results. Likewise, in FIG. 6, if the application of voltage to the pixel electrode 18 is changed to +3V, a substantial potential difference occurs between the gate line 11 and the pixel electrode 18. As shown in FIG. 6, in the case where a difference in potential between the common electrode 28 and the pixel electrode 18 is low, the bent alignment of the liquid crystal molecules 310 is even more severe than as shown in FIG. 5.

In the present invention, in order to minimize a reduction in picture quality caused by the formation of a bent electric field at edges of the unit pixel P, particularly at area A, the broken bent alignment of the liquid crystal molecules 310 is either reduced or prevented from extending into the region of the pixel P. As a method for reducing the broken bent alignment of the liquid crystal molecules 310, an additional electrode is provided to which is supplied a voltage identical to the voltage applied to the pixel electrode 18. With this configuration, the decline in the equipotential surface 400 is more smoothly formed at edges of the pixel electrode 18 (i.e., where orientation starts in the unit pixel) such that the bent electric field is weakened. This will be described in more detail with reference to FIG. 7.

Figure 7:
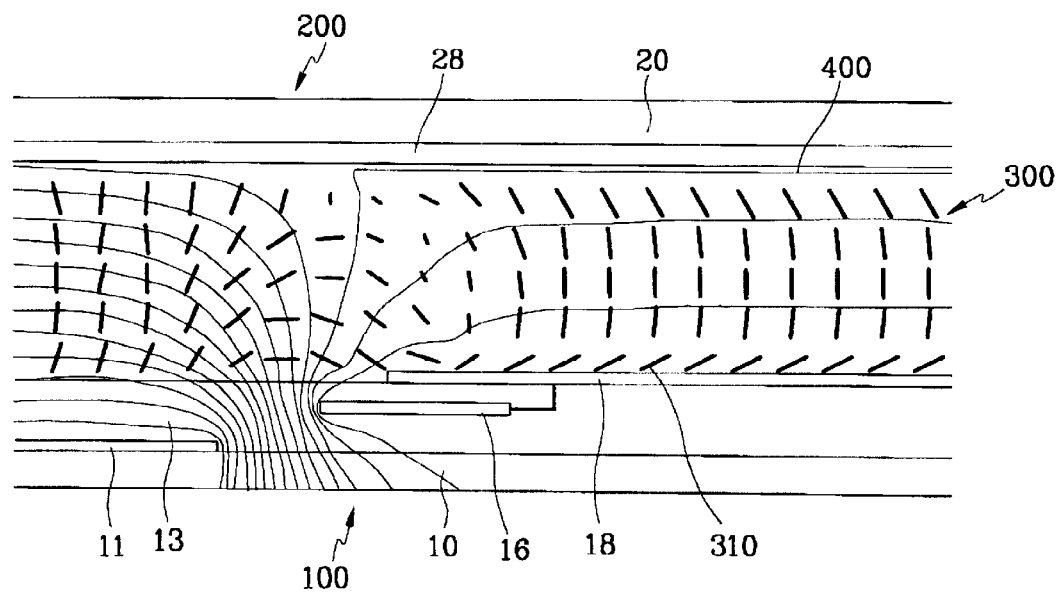
FIG. 7 is a schematic sectional view of a first embodiment of a liquid crystal display having a bent alignment of liquid crystal molecules according to the invention.

FIG. 7 shows a schematic sectional view of a liquid crystal display having a bent alignment of liquid crystal molecules according to a first preferred embodiment of the present invention.

As shown in the drawing, a buffer electrode 16 is formed under an edge portion of the pixel electrode 18. The buffer electrode 16 is electrically connected to the pixel electrode 18 and acts to reduce the bent electric field generated at area A as a result of a voltage applied to the buffer electrode 16 that is identical to the voltage applied to the pixel electrode 18. It is preferable that a portion or the entire buffer electrode 16 extends past the pixel electrode 18. If compared to FIG. 5, the equipotential surface 400 is not as sharply slanted in FIG. 7. The bent electric field is weakened as a result. The wiring 11 in this case can be either a gate line or a data line, and the buffer electrode 16 may be formed on the same layer as the gate line or data line. Further, it is possible to float the buffer electrode 16 rather than connecting the same to the pixel electrode 18 as described.

As a method for preventing the broken bent alignment of the liquid crystal molecules 310 from extending into the region of the pixel P, an aperture is formed in the pixel electrode 18. In particular, an aperture is formed at an edge portion of the pixel electrode 18. That is, an aperture is formed at a portion where orientation starts in the unit pixel such that an electric field is generated, where the electric field is bent in the same direction as the bent alignment direction of the liquid crystal molecules 310. This will be described in more detail with reference to FIG. 8.

Figure 8:
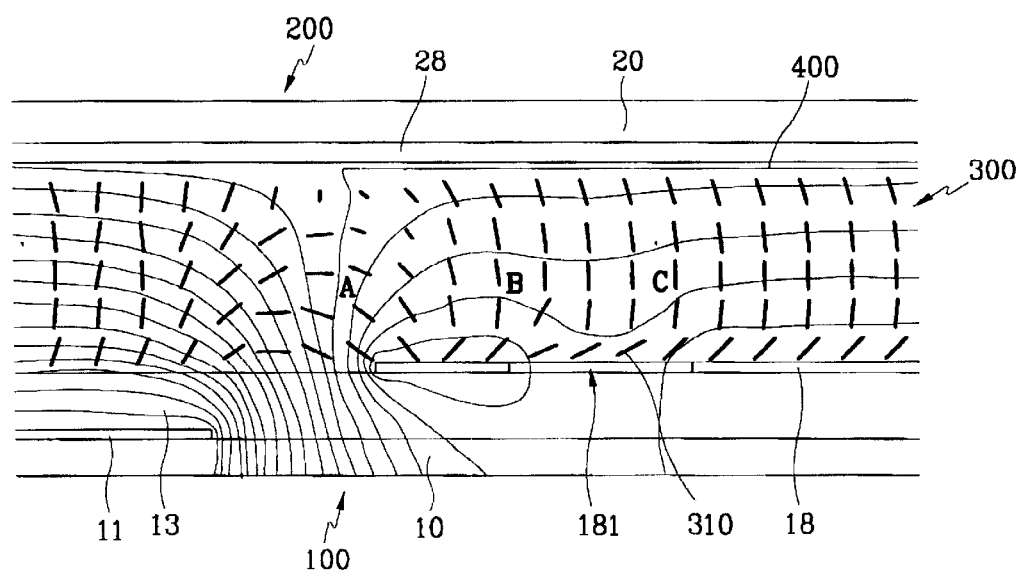
FIG. 8 is a schematic sectional view of a second embodiment of a liquid crystal display having a bent alignment of liquid crystal molecules according to the present invention.

FIG. 8 shows a schematic sectional view of a liquid crystal display having a bent alignment of liquid crystal molecules according to a second preferred embodiment of the present invention.

As shown in the drawing, an aperture 181 is formed close to an edge portion of the pixel electrode 18 where orientation starts in a unit pixel. With this configuration, an electric field that is bent in the same direction as the bent alignment of the liquid crystal molecules 310 is formed in area B, which is adjacent to the edge of the pixel electrode 18. Accordingly, even with the broken bent alignment of the liquid crystal molecules 310 in area B, the continuation of the broken alignment over the pixel electrode 18 is prevented by this electric field bent in the same direction as the bent alignment of the liquid crystal molecules 310.

Even with the above structure, although it is still possible for an electric field to be formed in area C that is opposite in direction to the bent alignment of the liquid crystal molecules (as in area A), the bent electric field formed in area C is extremely weak as shown in FIG. 8. Therefore, in the case where display characteristics are negatively affected in area C, a black matrix (not shown) formed on the upper substrate 20 may be extended over area C to solve this problem.

It is also possible to use both an aperture for limiting the broken alignment of the liquid crystal molecules 310 and a buffer electrode for weakening the bent electric field. This will be described in more detail with reference to FIGS. 9 and 10.

Figure 9:
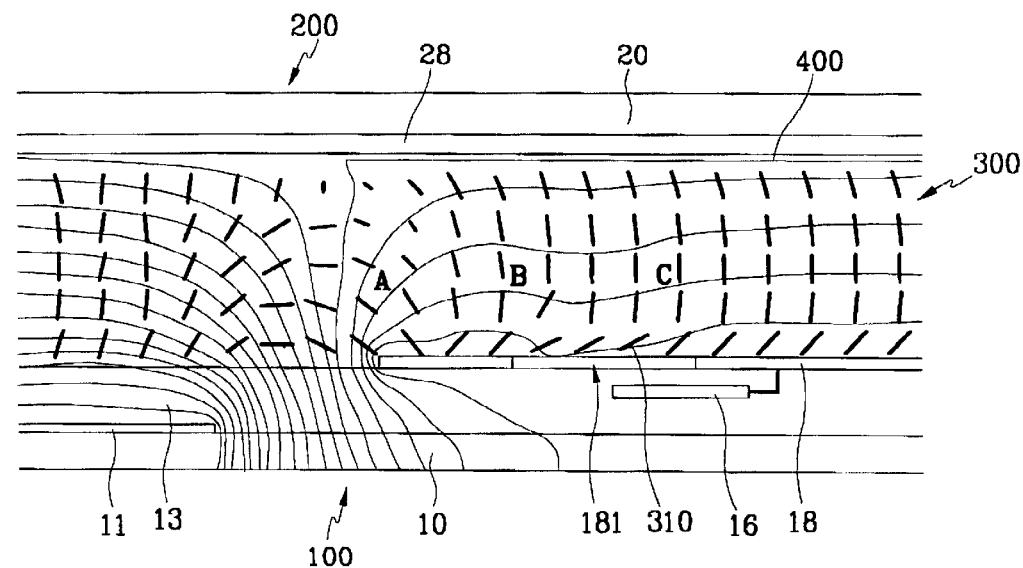
FIG. 9 is a schematic sectional view of a third embodiment of a liquid crystal display having a bent alignment of liquid crystal molecules at a first application of voltage, according to the present invention.
Figure 10:
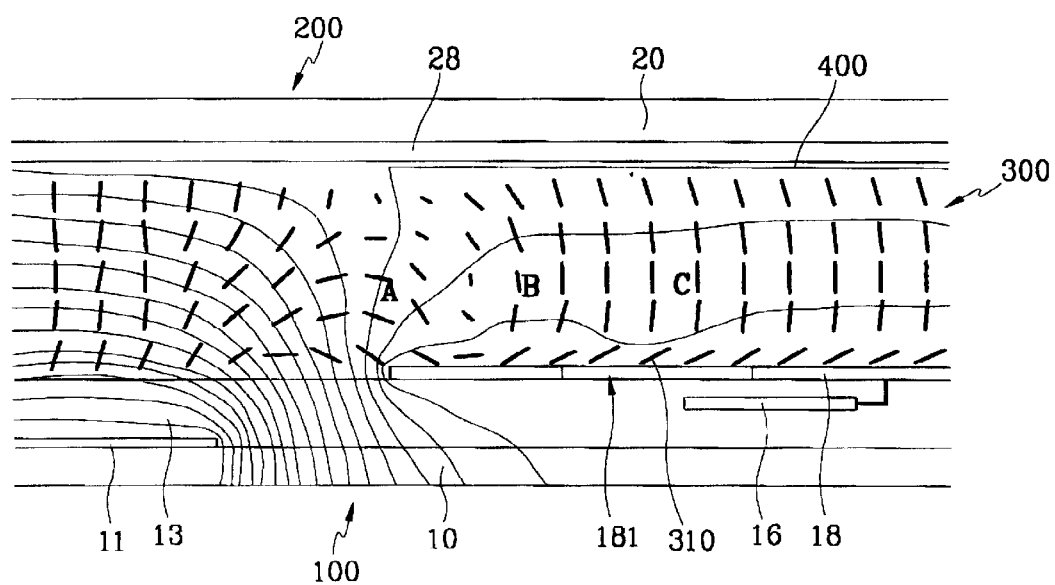
FIG. 10 is a schematic sectional view of a third embodiment of a liquid crystal display having a bent alignment of liquid crystal molecules at a second application of voltage according to the present invention.

FIGS. 9 and 10 show schematic sectional views of a third preferred embodiment of the liquid crystal display having a bent alignment of liquid crystal molecules according to the present invention. In FIG. 9, a 5V voltage is applied to the pixel electrode 18 while a 3V voltage is applied to the pixel electrode 18 in FIG. 10.

As shown in the drawings, with the formation of an aperture 181 near the edge of the pixel electrode 18, the broken bent alignment of the liquid crystal molecules 310 occurring in area A is prevented from extending into area B. Further, with the formation of a buffer electrode 16 that is electrically connected to the pixel electrode 18, the equipotential surface 400 is smoothly formed in area C to thereby minimize the influence of the bent electric field generated in area C. It is preferable that the buffer electrode 16 extends partly into an area under the aperture 181 or completely under the aperture 181. In the case where the buffer electrode 16 extends partly into the area under the aperture 181, it is preferable that the resulting portion of the pixel electrode 18 overlapping the buffer electrode 16 is an inward portion of the pixel electrode 18 rather than the edge portion of the same.

A structure of a thin film transistor substrate used in a liquid crystal display having a bent alignment of liquid crystal molecules will now be described.

Figure 11:
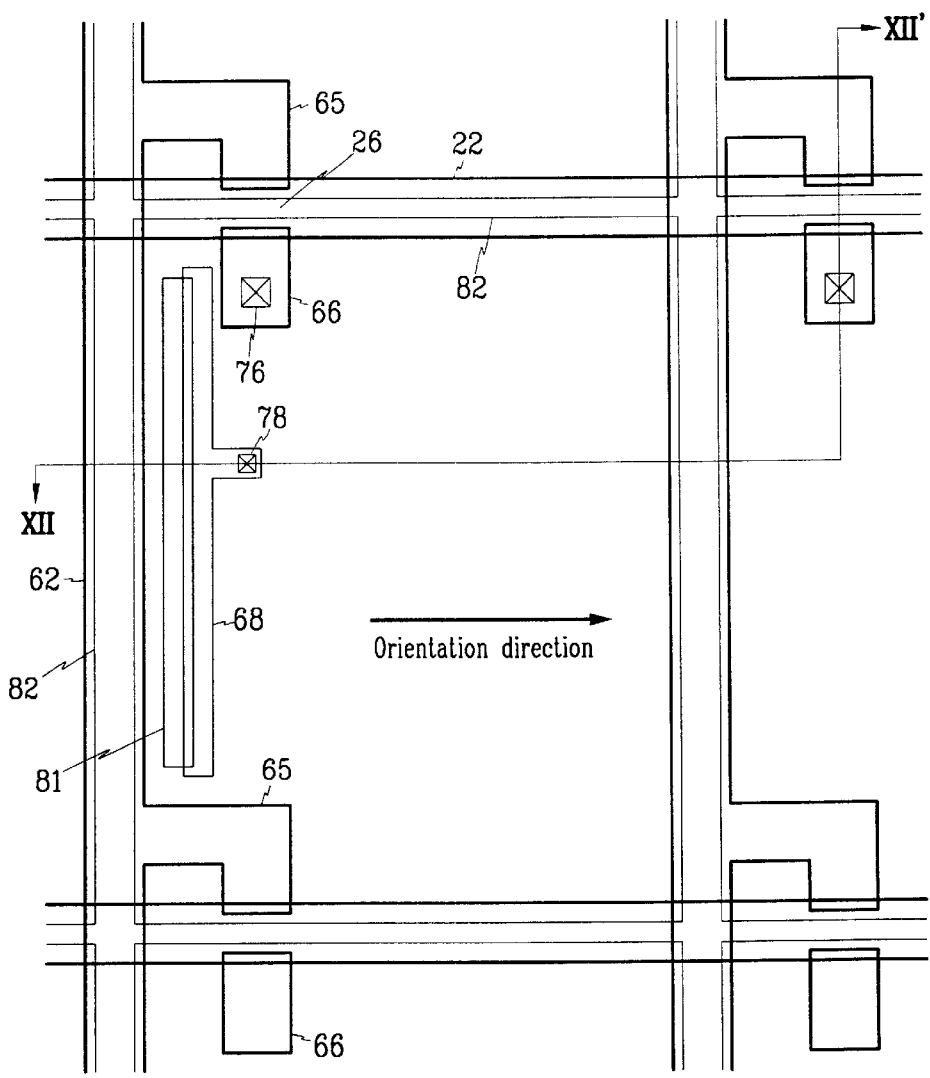
FIG. 11 is a schematic view of a thin film transistor substrate used in a fourth embodiment of a liquid crystal display having a bent alignment of liquid crystal molecules, according to the present invention.
Figure 12:
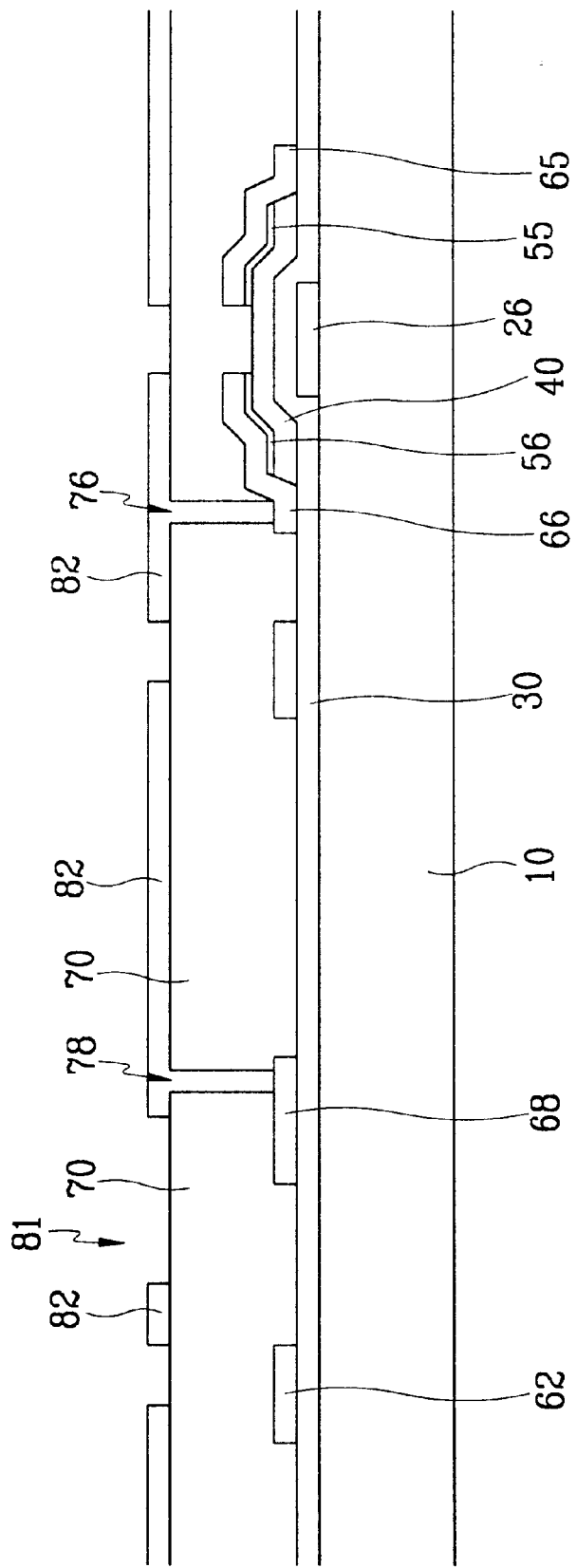
FIG. 12 is a sectional view taken along line XII–XII' of FIG. 11.

FIG. 11 shows a schematic view of a thin film transistor substrate according to a fourth preferred embodiment of the present invention, and FIG. 12 shows a sectional view taken along-line XII–XII' of FIG. 11. Only partial views are shown in FIGS. 11 and 12, and it is to be assumed that the structure to be described continues over the entire area of the substrate.

Gate wiring is formed on an insulating lower substrate 10. The gate wiring includes gate lines 22 extended horizontally (FIG. 11) and gate electrodes 26 of a thin film transistor, the gate electrodes 26 being connected to the gate lines 22. The gate wiring also includes gate pads (not shown). The gate pads are connected to ends of the gate lines 22 and receive gate signals. The gate signals are then transmitted to the gate lines 22 by the gate pads.

A gate insulation layer 30 made of a material such as $SiN_x$ is formed covering the gate wiring. A semiconductor layer 40 made of a semiconductor such as amorphous silicon is formed over the gate insulation layer 30 at an area corresponding to the gate electrodes 26. As a result of the formation of the gate insulation layer 30 and the semiconductor layer 40 over the gate electrodes 26, the gate insulation layer 30 and the semiconductor layer 40 protrude in a direction away from the lower substrate 10. Ohmic contact layers 55 and 56 are formed on the semiconductor layer 40. The ohmic layer is made of such material as n+ hydrogenated amorphous silicon that has been doped at a high concentration with silicide or n-type impurities.

Data wiring is formed over the resistance contact layers 55 and 56 and the gate insulation layer 30. The data wiring is made of a conducting material such as metal and includes data lines 62 formed vertically (in FIG. 11) to cross the gate lines 22, thereby defining unit pixels P, source electrodes 65 branched from the data lines 62 and extending over the ohmic contact layers 55, and drain electrodes 66 separated from the source electrodes 65 and formed on top of the ohmic contact layers 56 extending in a direction opposite the drain electrodes 66 with respect to the gate electrode 26. The data wiring also includes data pads (not shown) connected to one end of the data lines 62. The data pads receive image signals.

Buffer electrodes 68 are formed on the gate insulation layer 30 on the same layer as the elements 62, 65 and 66 of the data wiring. That is, the buffer electrodes 68 are formed in the same direction as the data lines 62 at an edge of the unit pixel P where orientation begins. The buffer electrodes 68 are formed in line with the data lines 62 (i.e., vertically) since the orientation direction of the liquid crystal molecules is in the horizontal direction in FIG. 11.

A protection layer 70 is formed over the elements 62, 65 and 66 of the data wiring, the buffer electrodes 68, and portions of the semiconductor layer 40 not already covered. Contact holes 76 and 78 exposing portions of the drain electrodes 66 and buffer electrodes 68, respectively, are formed in the protection layer 70. It is possible to form additional contact holes for exposing the data pads, the gate insulation layer 30 and the gate pads.

Pixel electrodes 82 are formed on the protection layer 70 in the area of a pixel. The pixel electrodes 82 are electrically connected to the drain electrodes 66 via the contact holes 76. Auxiliary gate pads and auxiliary data pads, which are connected respectively to the gate pads and the data pads through contact holes of the protection layer 70, may be formed on the same layer as the pixel electrodes 82.

Further, apertures 81 are formed in line with the buffer electrodes 68 at an edge portion of the pixel electrodes 82 where alignment starts. The apertures 81 are formed and operate as described in the above embodiments. That is, the apertures 81 act to prevent the spread of the broken bent alignment of the liquid crystal molecules.

The pixel electrodes 82, with reference to FIG. 11, overlap the gate lines 22 to form a storage capacitor, and when a storage capacitance is insufficient, it is possible to add wiring for storage capacitance on the same layer as the elements 22 and 26 of the gate wiring and adjacent to the data lines 62.

In the fourth embodiment described above, although the structure corresponds to the case where the orientation direction is in the horizontal direction as shown in FIG. 11, if the orientation direction is in the vertical direction, it is possible to form the buffer electrodes 68 and apertures 81 in line with the gate lines 22. This will be described in more detail with reference to FIG. 13.

Figure 13:
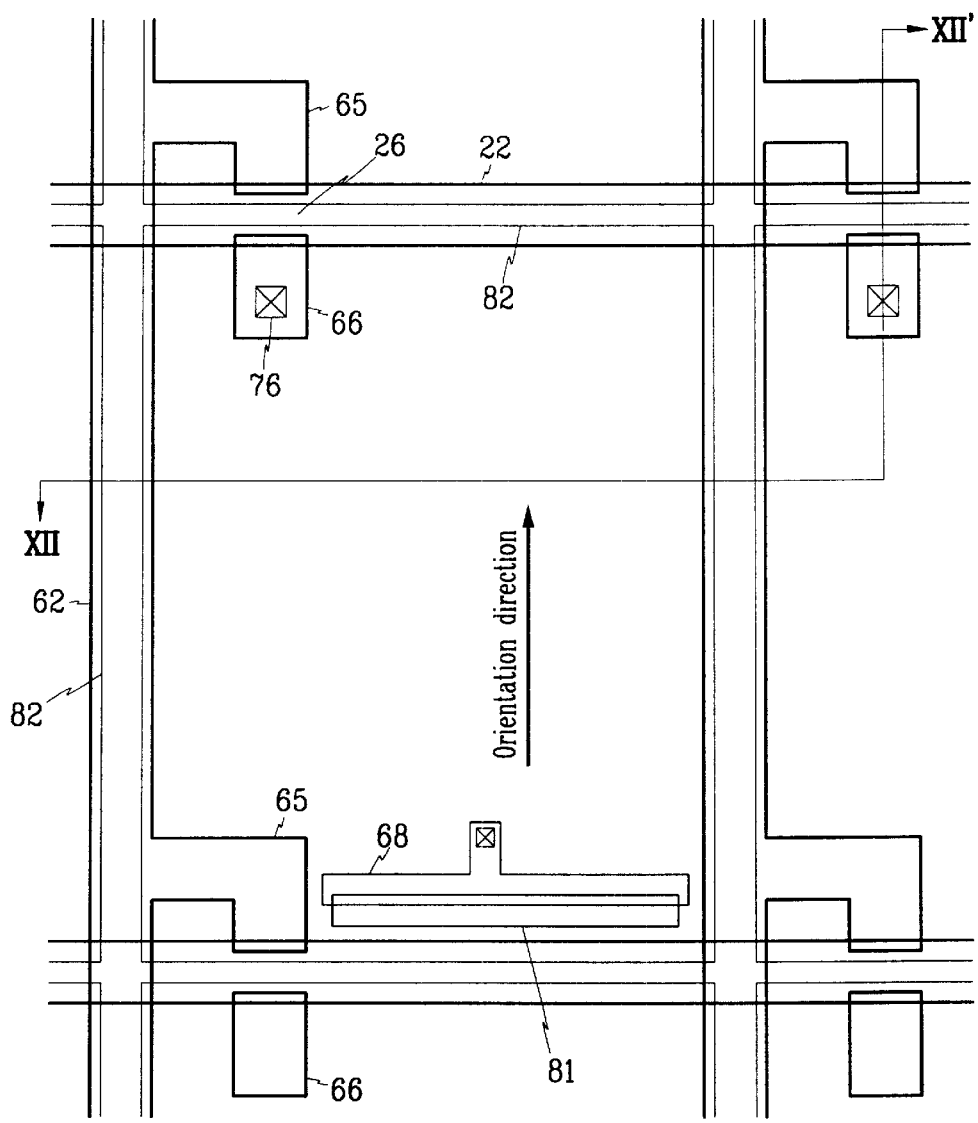
FIG. 13 is a schematic view of a thin film transistor substrate used in a fifth embodiment of a liquid crystal display having a bent alignment of liquid crystal molecules, according to the present invention.

FIG. 13 shows a schematic view of a thin film transistor substrate according to a fifth preferred embodiment of the present invention. Most of the structure of the fifth embodiment is identical to that of the fourth embodiment. As a result, only different aspects will be described and like reference numerals will be used for like parts.

Unlike the fourth embodiment, the orientation direction is in the vertical direction (in FIG. 13), that is, parallel to the data lines 62. Accordingly, the buffer electrodes 68 are formed horizontally at a lower edge portion (in the drawing) of the unit pixel P where orientation starts. The apertures 81 are also formed horizontally at the lower edge portion of the unit pixel where orientation starts. If rubbing occurs in the long direction with this structure, since horizontal sides of the unit pixels P are short, the region where a broken alignment of the liquid crystal molecules takes place is further reduced.

In yet a different structure, the buffer electrodes 68 may be formed on the same layer as the gate lines 22, and the pixel electrodes 82 may be formed over the gate insulation layer 30. Also, to prevent the broken bent alignment of the liquid crystal molecules, a pretilt angle of the liquid crystal molecules, that is an angle made between the substrate and the long axes of the liquid crystal molecules may be controlled.

Figure 14:
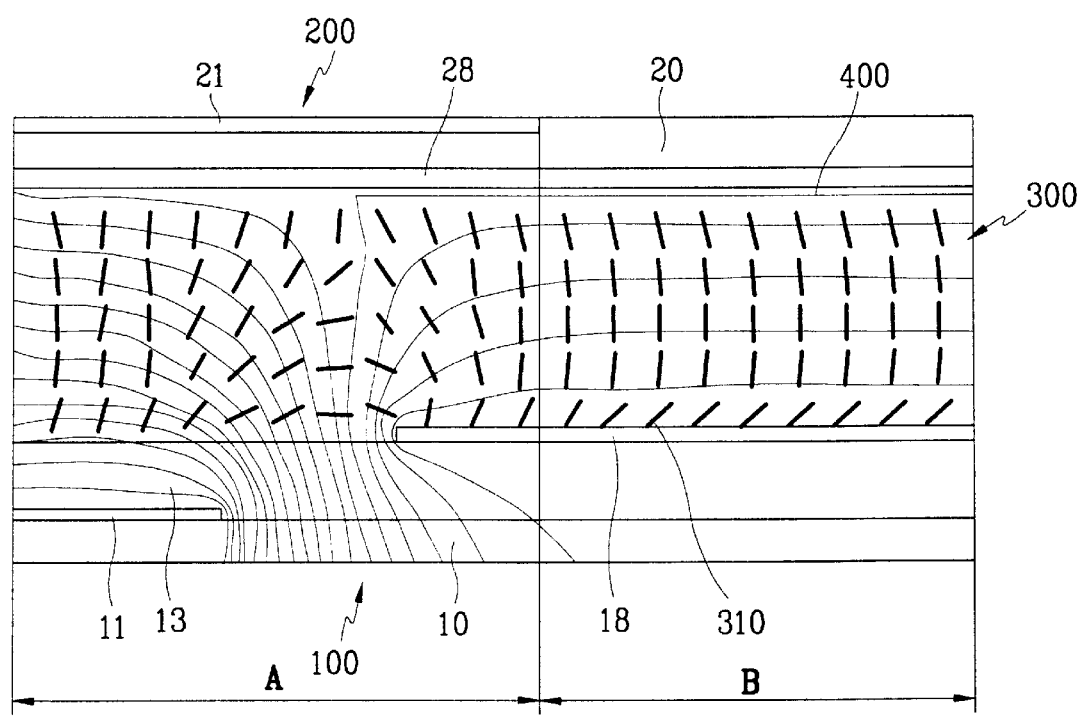
FIG. 14 is a schematic sectional view of a sixth embodiment of a liquid crystal display having a bent alignment of liquid crystal molecules according to the present invention.

FIG. 14 shows a schematic sectional view of a liquid crystal display having a bent alignment of liquid crystal molecules according to a sixth preferred embodiment of the present invention. Here, a 0V voltage is applied to the common electrodes 28, a −15V voltage is applied to the wiring 11, and a +5V voltage is applied to the pixel electrode 18. Most of the structure of the sixth embodiment is identical to that of previous embodiments. Accordingly, only different aspects will be described and like reference numerals will be used for like parts.

A black matrix 21 having an aperture is formed at a portion corresponding to a unit pixel P of the lower substrate 10 and the upper substrate 20. The liquid crystal molecules 310 of area A, which corresponds to the location of the black matrix 21, are oriented having a pretilt angle of 40° or more with respect to the lower substrate 10, while the liquid crystal molecules 310 of area B, where the black matrix 21 is not formed, having a pretilt angle of approximately 10° with respect to the lower substrate 10. It is preferable that the pretilt angle of area A is at least 20° and that of area B is in the range of 2–20°.

As shown in FIG. 14, even with an abrupt and steep decline in the equipotential surface 400, since the liquid crystal molecules 310 have a large pretilt angle, only a minimal break in the bent alignment of the liquid crystal molecules 310 in area A occurs.

Generally speaking, if the liquid crystal molecules are oriented at a small pretilt angle, although it is difficult to obtain a stable bent alignment, brightness and response speed characteristics are favorable. On the other hand, if the liquid crystal molecules are oriented at a large pretilt angle, although a stable bent orientation can be obtained, a sharp reduction in display characteristics such as brightness and response speed occurs.

Accordingly, if the liquid crystal molecules 310 are oriented having a large pretilt angle in area A corresponding to the formation of the black matrix 21, while the liquid crystal molecules 310 are oriented having a small pretilt angle in area B, both a stable bent alignment of the liquid crystal molecules 310 throughout the liquid crystal display is obtained and good display characteristics are ensured. This will be described in more detail hereinafter.

FIGS. 15A, 15B, 15C, and 15D show schematic sectional views of the liquid crystal display of FIG. 14 used for describing a manufacturing process of the same.

Figure 15A:
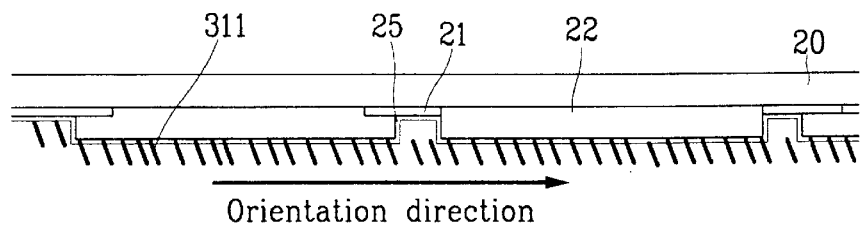
FIG. 15A is a schematic sectional view of the sixth embodiment of the liquid crystal display, illustrating the formation of an orientation layer on an upper substrate.
Figure 15B:
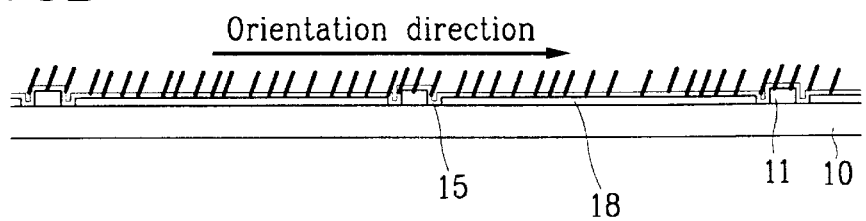
FIG. 15B is a schematic sectional view of the sixth embodiment illustrating the formation of an orientation layer on a lower substrate.

As shown in FIGS. 15A and 15B, an orientation layer 15 is formed on an innermost surface of the lower substrate 10, which includes the wiring 11 and the pixel electrode 18. As shown in FIG. 15A, an orientation layer 25 is formed on an innermost surface of the upper substrate 20, which includes the black matrix 21 and a color filter 22 positioned opposing the pixel electrode 18 shown in FIG. 15B. The orientation layers 15 and 25 provide an orienting force to the liquid crystal molecules in the same direction. Because the orientation directions are identical, the molecules have a large pretilt angle with respect to the substrates 10 and 20. Here, an orienting material having a large pretilt angle may be used for the orientation layers 15 and 25. After depositing a vertical orientation layer, an orientation process may be performed to obtain a large pretilt angle using an exposure process that uses rubbing or infrared rays. Reference numeral 311 in the drawings indicates the pretilt angle of the liquid crystal molecules (rather than the liquid crystal molecules themselves).

The upper substrate 20 also includes a common electrode (not shown). The wiring 11 may be either gate lines or data lines. Also, the wiring 11 and the pixel electrode 18 are electrically connected, and the lower substrate 10 further includes a thin film transistor having gate electrodes connected to the gate lines, source electrodes connected to the data lines, drain electrodes connected to the pixel electrodes, and a semiconductor layer.

Figure 15C:
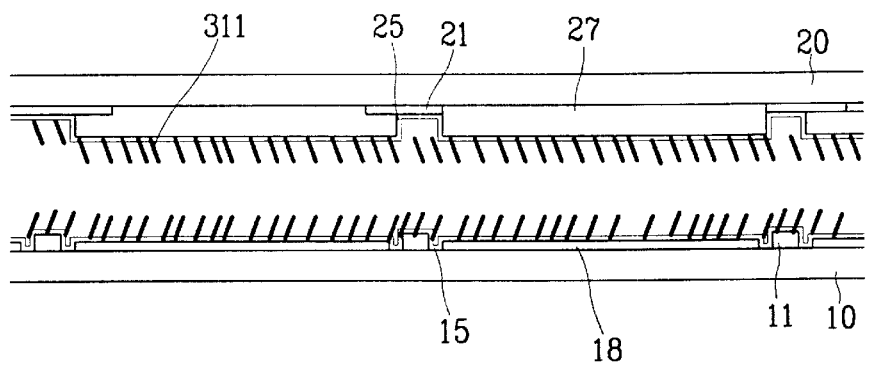
FIG. 15C is a schematic sectional view of the sixth embodiment illustrating the alignment and connection of the upper and lower substrates.
Figure 15D:
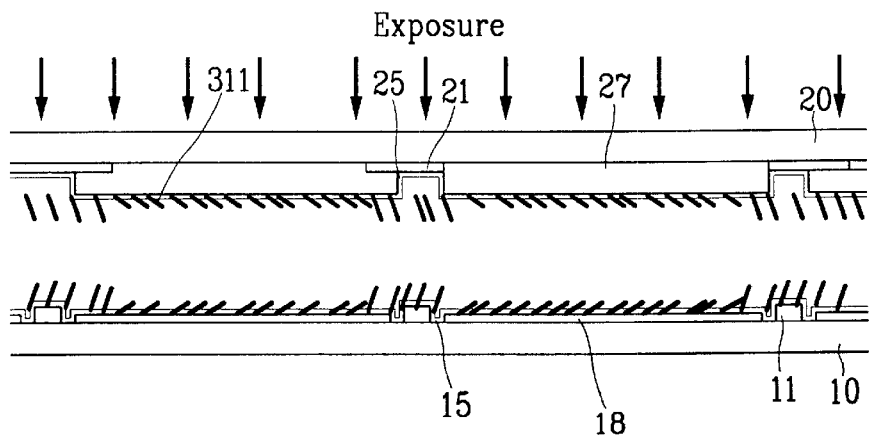
FIG. 15D is a schematic sectional view of the sixth embodiment illustrating the formation of upper and lower orientation layers.

As shown in FIG. 15C, the upper substrate 20 and the lower substrate 10 are aligned and connected with a predetermined gap therebetween. Referring to FIG. 15D, an outer surface of the upper substrate 20 is exposed using infrared rays, etc. in order to provide the orientation layers 15 and 25 with a small pretilt angle. As a result, the orientation layers 15 and 25 come to have a small pretilt angle except at areas where the black matrix 21 is formed. That is, the black matrix 21 covers these areas so that they are not exposed to the infrared rays to thereby maintain their original large pretilt angle.

In the above, light is irradiated on the outer surface of the upper substrate 20, and the black matrix 21 is used to block the light. However, it is also possible to irradiate light on an outer surface of the lower substrate 10. In this case, the wiring 11 may be used as a mask to block the light or a mask may be used on the lower substrate 10.

In addition to the structure of the sixth embodiment in which predetermined portions have a large pretilt angle in order to prevent the broken bent alignment of the liquid crystal molecules, the liquid crystal display may be produced in a pretilt angle range for preventing such a broken bent alignment of the liquid crystal molecules and for obtaining a stable bent alignment of the liquid crystal molecules throughout the display. This will be described in more detail below.

Figure 16A:
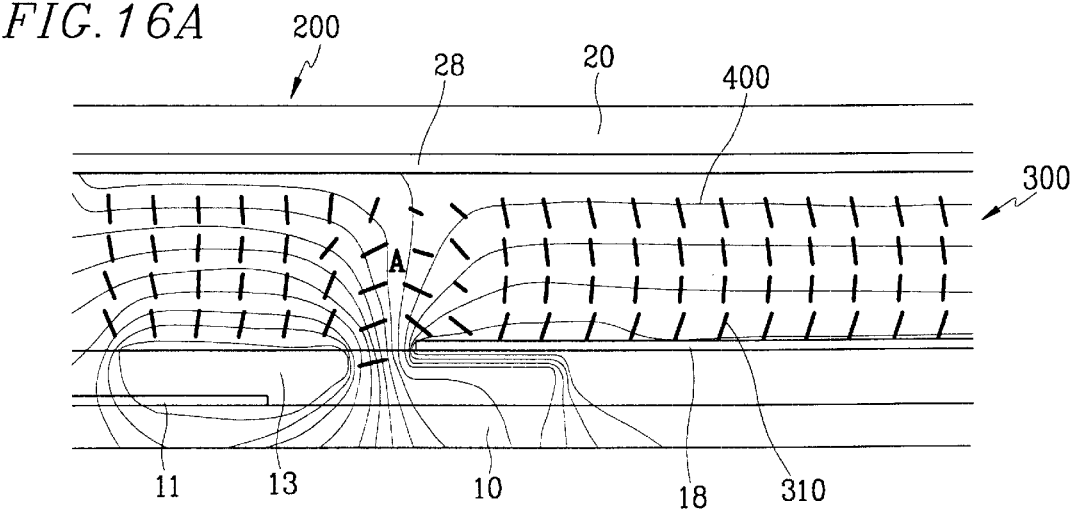
FIG. 16A is a schematic sectional view of a seventh embodiment of a liquid crystal display having a bent alignment of liquid crystal molecules at a first pretilt angle according to the present invention.
Figure 16B:
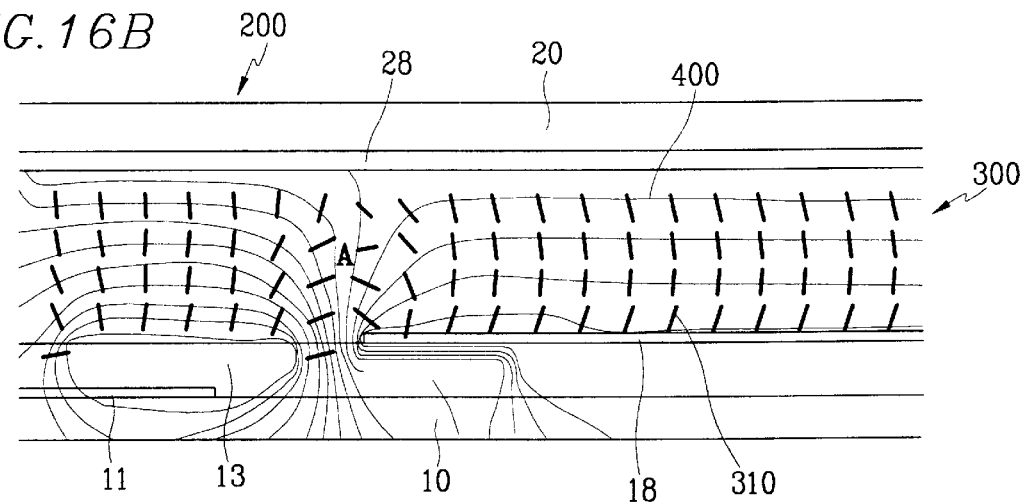
FIG. 16B is a schematic sectional view of the seventh embodiment at a second pretilt angle according to the present invention.
Figure 16C:
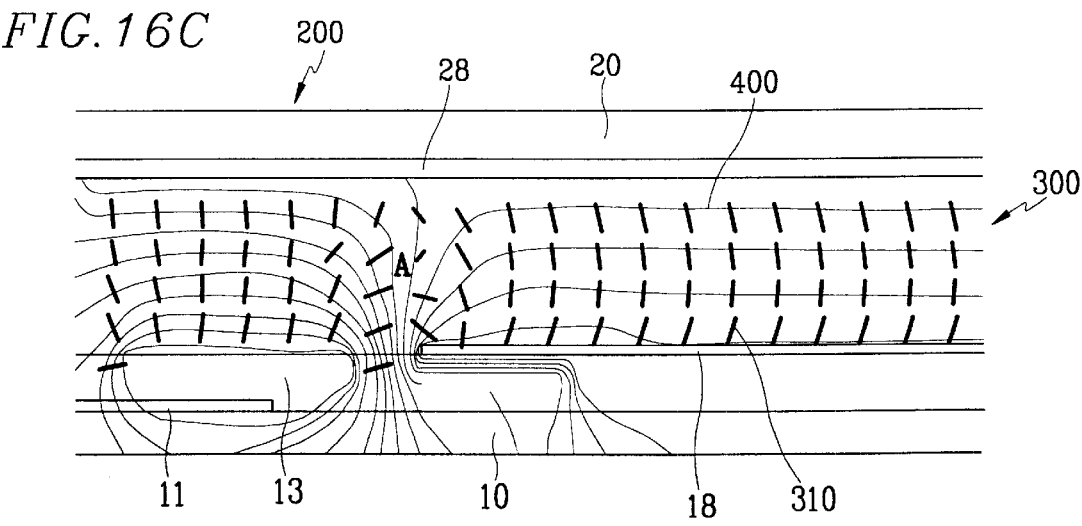
FIG. 16C is a schematic sectional view of the seventh embodiment at a third pretilt angle according to the present invention.

FIGS. 16A, 16B, and 16C show schematic sectional views of a liquid crystal display having a bent alignment of liquid crystal molecules according to a seventh preferred embodiment of the present invention. In this embodiment, an attempt is made to optimize the pretilt angle. In particular, FIG. 16A shows the case where the pretilt angle is 15°, FIG. 16B shows the case where the pretilt angle is 25°, and FIG. 16C shows the case where the pretilt angle is 35°. Also, in the drawings, a +5V voltage is applied to the common electrode 28, a +2.5V voltage is applied to the pixel electrode 18, and a −5V voltage is applied to the wiring 11.

As shown in the drawings, when the pretilt angle is increased from 15° to 35°, the degree to which there is a break in the bent alignment of the liquid crystal molecules 310 in area A is reduced. It is preferable that orientation processing is performed such that the pretilt angle of the liquid crystal molecules 310 is between 10 and 35°.

In the first embodiment, a buffer electrode is used to reduce the strength of the bent electric field generated where orientation starts in a unit pixel such that the slant in the equal potential surface is smooth. However, a reduction in the strength of the bent electric field can also be achieved through the use of a protrusion pattern made of an insulation material that is highly anisotropic. This will be described below.

FIGS. 17A, 17B, 17C, 17D, and 17E show schematic sectional views of a liquid crystal display having a bent alignment of liquid crystal molecules according to an eighth preferred embodiment of the present invention.

Figure 17A:
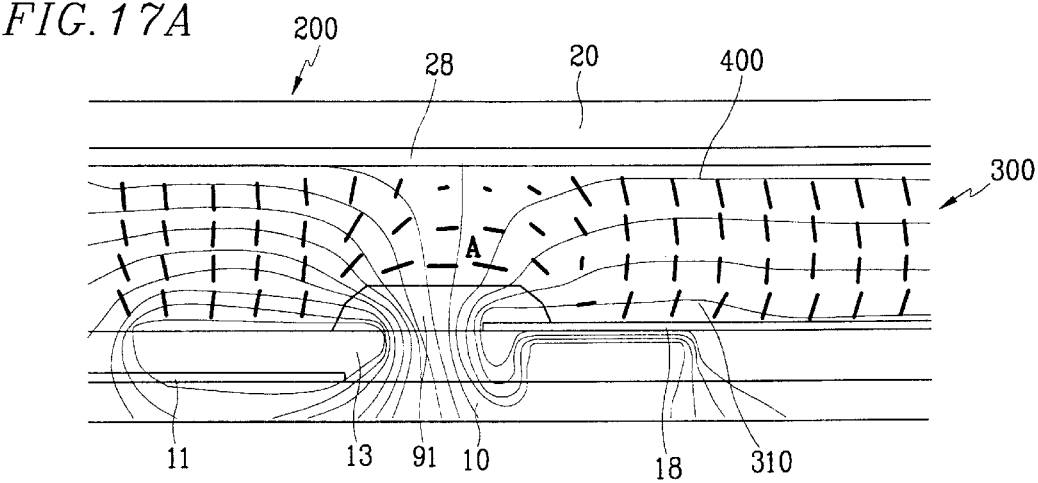
FIG. 17A is a schematic sectional view of an eighth embodiment of a liquid crystal display having a bent alignment of liquid crystal molecules, at a first anisotropy of a protrusion pattern according to the present invention.
Figure 17B:
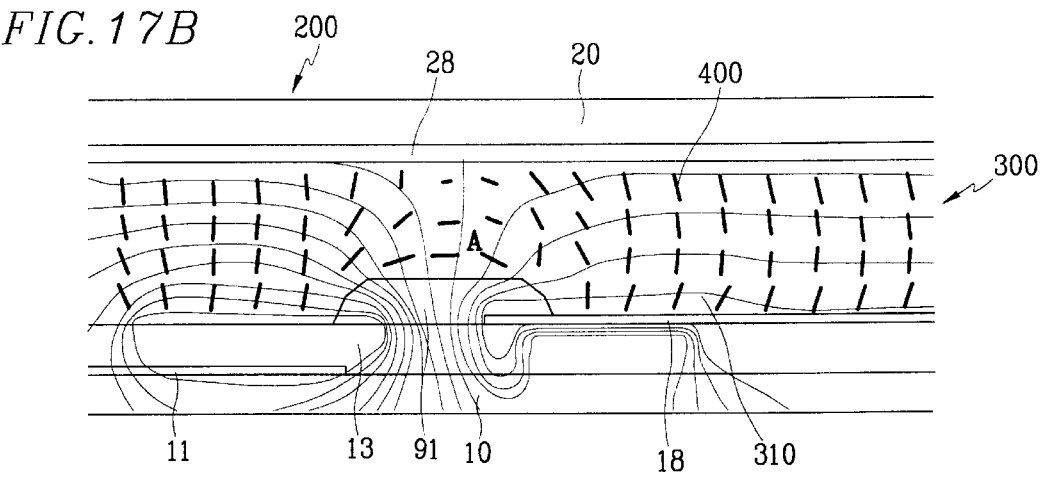
FIG. 17B is a schematic sectional view of the eighth embodiment at a second anisotropy of a protrusion pattern according to the present invention.
Figure 17C:
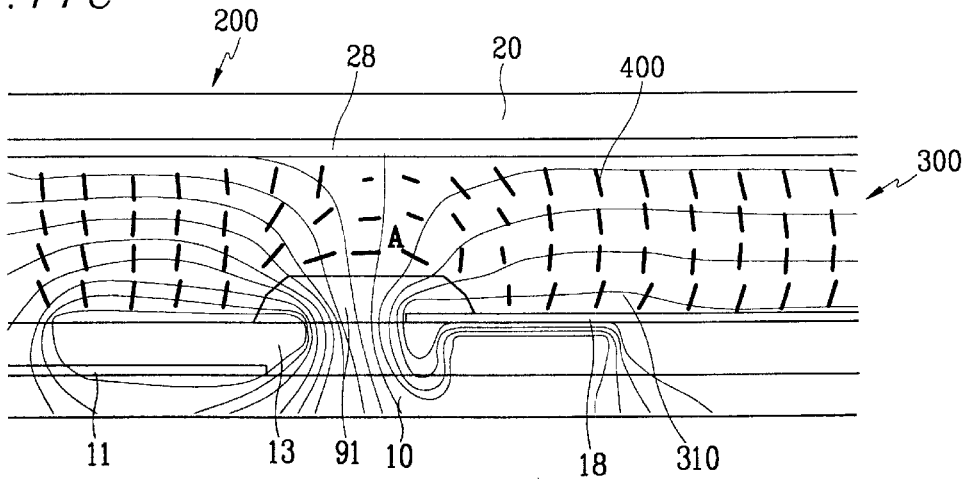
FIG. 17C is a schematic sectional view of the eighth embodiment at a third anisotropy of a protrusion pattern according to the present invention.

As shown in the drawings, a protrusion pattern 91 is formed on the lower substrate 10. An edge of the protrusion pattern 91 covers an edge portion of the pixel electrode 18. Voltages applied are identical to the voltages applied in the seventh preferred embodiment. That is, a +5V voltage is applied to the common electrode 28, a +2.5V voltage is applied to the pixel electrode 18, and a −5V voltage is applied to the wiring 11. Further, a pretilt angle in FIGS. 17A, 17B and 17C is 6°, and anistropies of the protrusion pattern are 5 and 7 in FIG. 17D and FIG. 17E, respectively. In FIGS. 17A, 17B and 17C, the anisotropy of the protrusion pattern is varied to result in the various degrees of breaking in the bent alignment of the liquid crystal molecules, while in FIGS. 17D and 17E, the pretilt angle is varied respectively between 6° and 15° to result in the differing degrees of breaking in the bent alignment of the liquid crystal molecules.

Figure 17D:
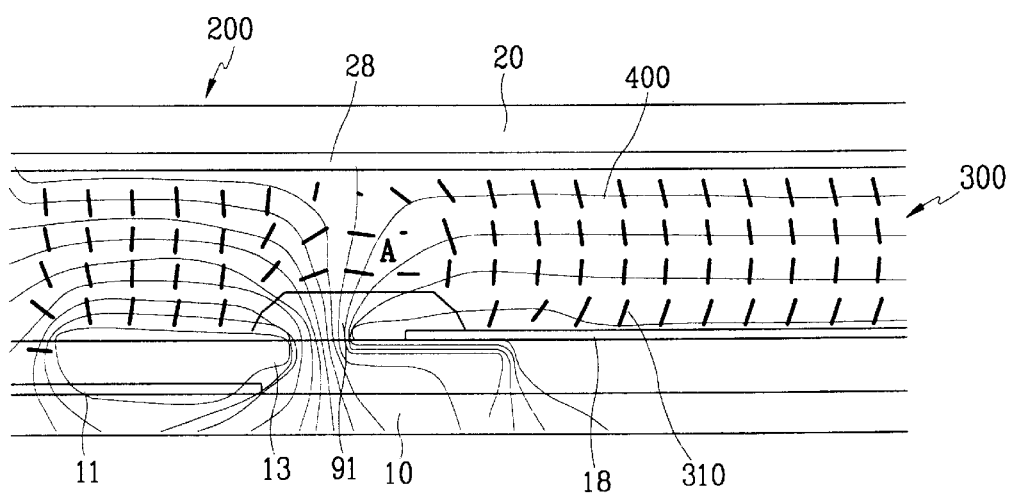
FIG. 17D is a schematic sectional view of the eighth embodiment at a first pretilt angle according to the present invention.
Figure 17E:
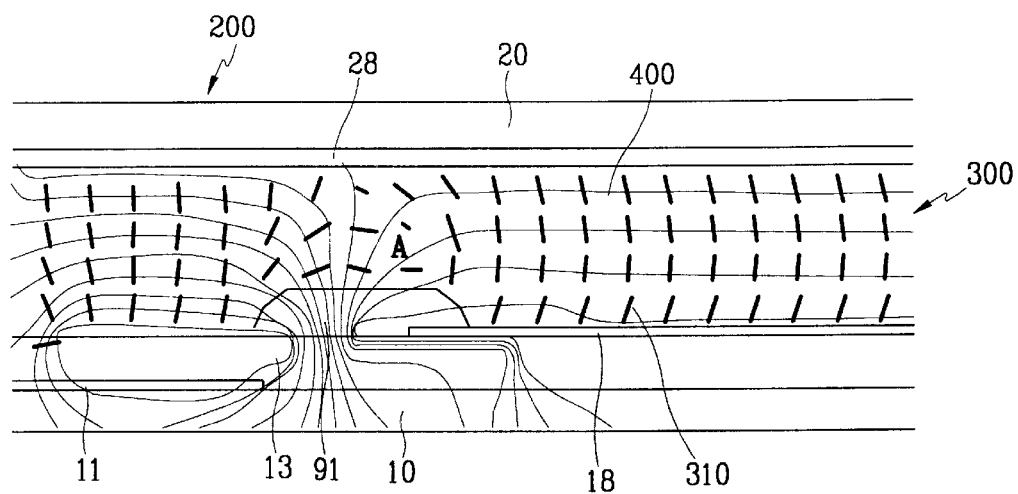
FIG. 17E is a schematic sectional view of the eighth embodiment at a second pretilt angle according to the present invention.

As shown in FIGS. 17A, 17B and 17C, in the case where the anisotropy of the protrusion pattern 91 is varied from 1 to 7, the break in the bent alignment of the liquid crystal molecules 310 is reduced in area A. Preferably, the anisotropy of the protrusion pattern 91 is from 3 to 7. As shown in FIG. 17D, at a pretilt angle of 6°, the break in the bent alignment of the liquid crystal molecules 310 is reduced in area A. The break in the bent alignment is even further reduced, at a pretilt angle of 15°, as shown in FIG. 17E.

Figure 18:
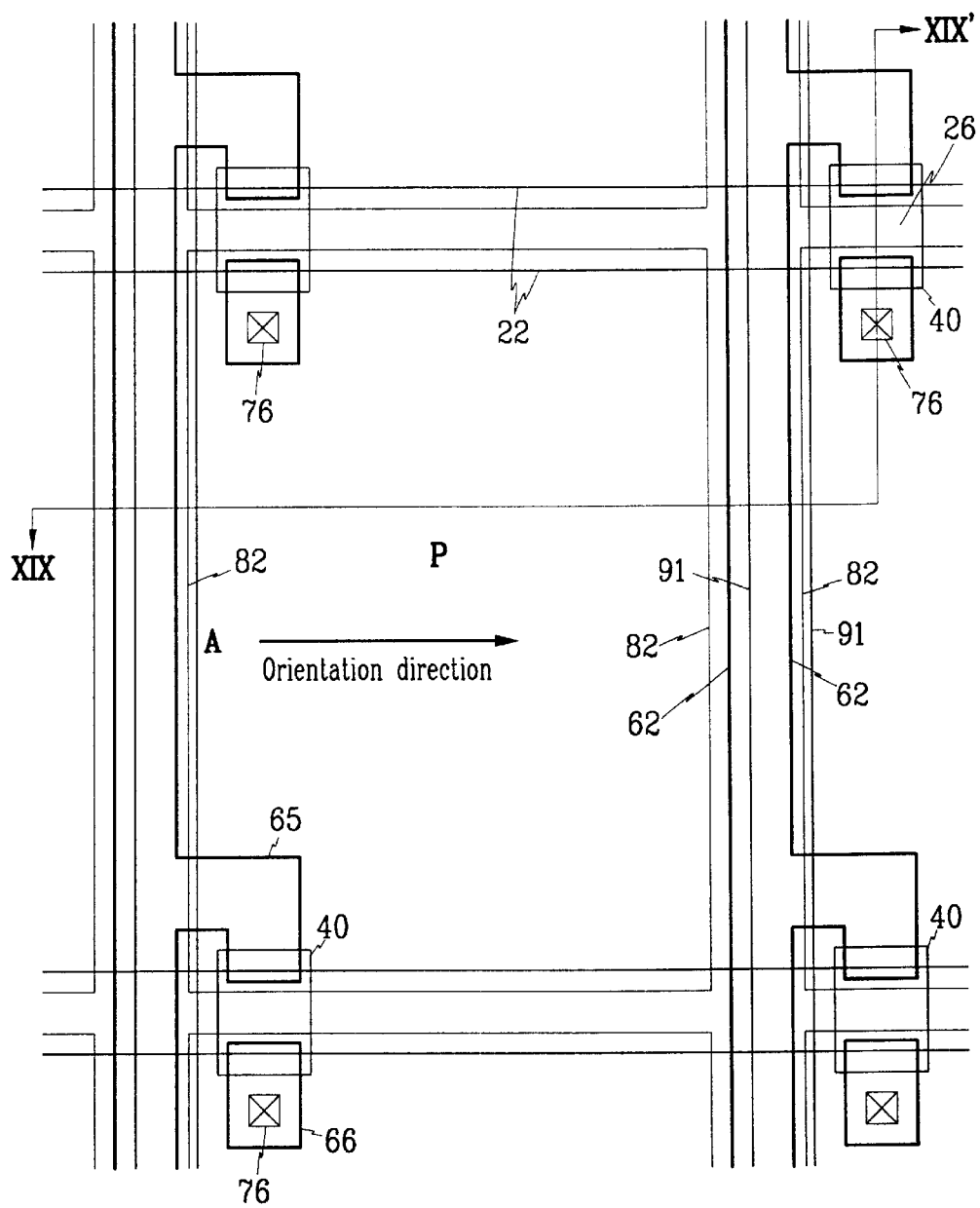
FIG. 18 is a schematic view of a thin film transistor substrate used in the eighth embodiment of a liquid crystal display having a bent alignment of liquid crystal molecules, according to the present invention.
Figure 19:
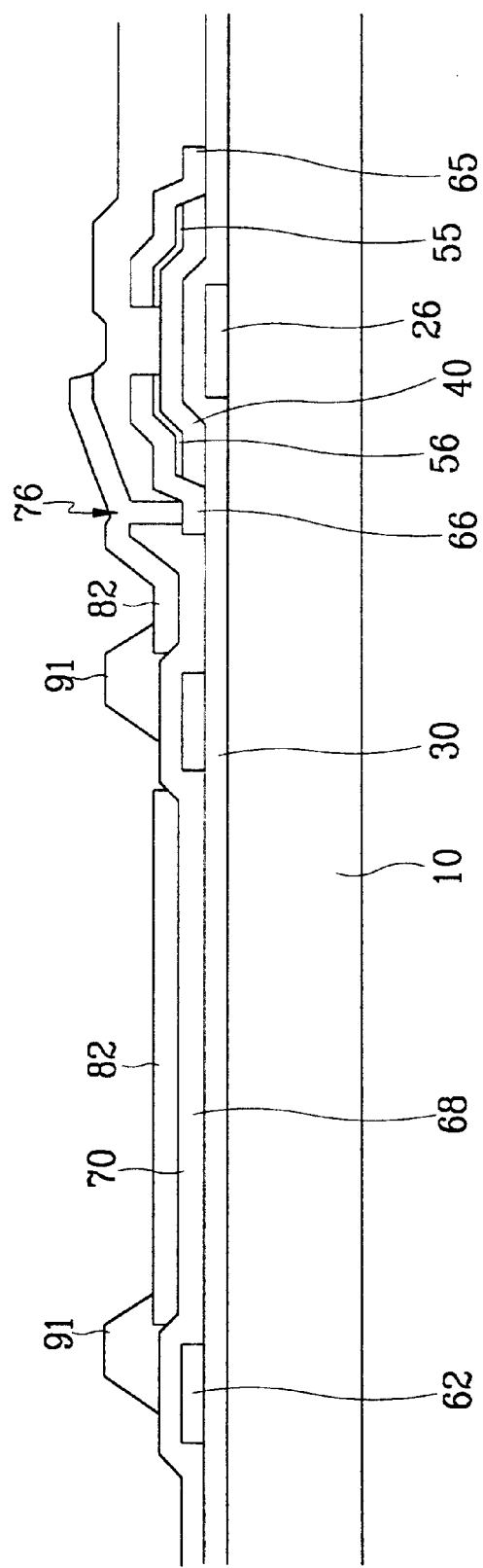
FIG. 19 is a sectional view taken along line XIX–XIX' of FIG. 18.

FIG. 18 shows a schematic view of a thin film transistor substrate according to an eighth preferred embodiment of the present invention, and FIG. 19 shows a sectional view taken along line XIX–XIX' of FIG. 18. Most of the structure of the eighth embodiment is identical to that of the fourth and fifth embodiments. Accordingly, only different aspects will be described and like reference numerals will be used for like parts.

Protrusion patterns 91 are formed in line with the data lines 62 in area A where orientation starts in the unit pixel P. The protrusion patterns 91 may be formed partially or fully covering the data lines 62, and in the case where the orientation direction is vertical (in FIG. 18), the protrusion patterns 91 may be formed over an edge of the pixel electrodes 82 in line with the gate lines 22.

In the second embodiment, an aperture is formed at an edge portion of the pixel electrode to generate a bent electric field in the direction of the orientation direction such that the broken bent alignment of the liquid crystal molecules is prevented from extending into the region of the unit pixel. However, the same effect may be obtained by forming an aperture in the common electrode. This will be described in more detail with reference to the drawings.

Figure 20:
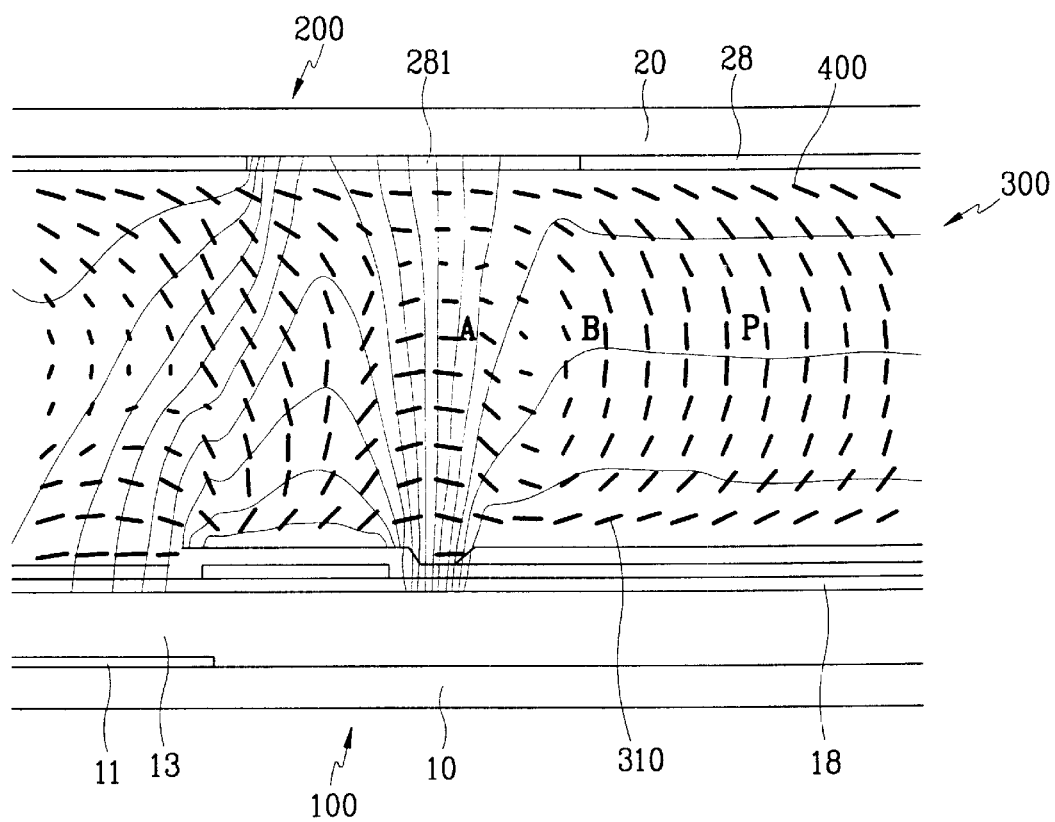
FIG. 20 is a schematic sectional view of a ninth embodiment of a liquid crystal display having a bent alignment of liquid crystal molecules according to the present invention.

FIG. 20 shows a schematic sectional view of a liquid crystal display having a bent alignment of liquid crystal molecules according to a ninth preferred embodiment of the present invention.

As shown in the drawing, an aperture 281 is formed in the common electrode 28, which is provided over an entire surface of the upper substrate 20. As a result, the broken bent alignment of the liquid crystal molecules 310 occurring in area A is prevented from extending further into the unit pixel P, that is, into area B. As with the second to fifth embodiments, it is preferable that the aperture 281 is formed vertically to the orientation direction in the area of the unit pixel P where orientation starts. Further, in order to form the electric field in the bent orientation direction of the liquid crystal molecules 310, it is preferable that a boundary portion of the pixel electrode 18 is exposed by the aperture 281.

As another method, rather than controlling the broken bent alignment of the liquid crystal molecules using an electric field, pretilt angles or a protrusion pattern, light that is leaked by the broken alignment of the liquid crystal molecules may be blocked using an opaque layer. This will be described in more detail below.

Figure 21A:
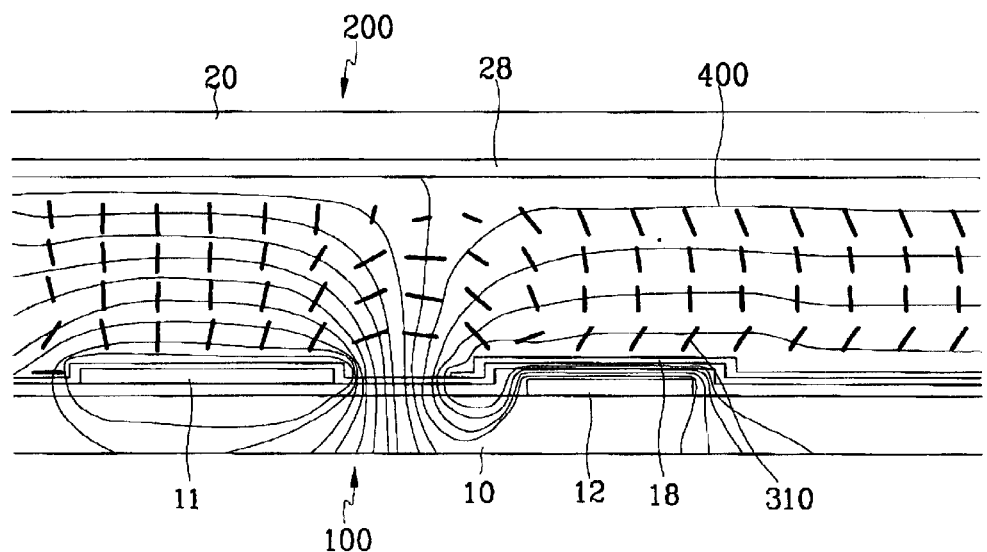
FIGS. 21A and 21B are schematic sectional views of a tenth embodiment of a liquid crystal display having a bent alignment of liquid crystal molecules according to the present invention.
Figure 21B:
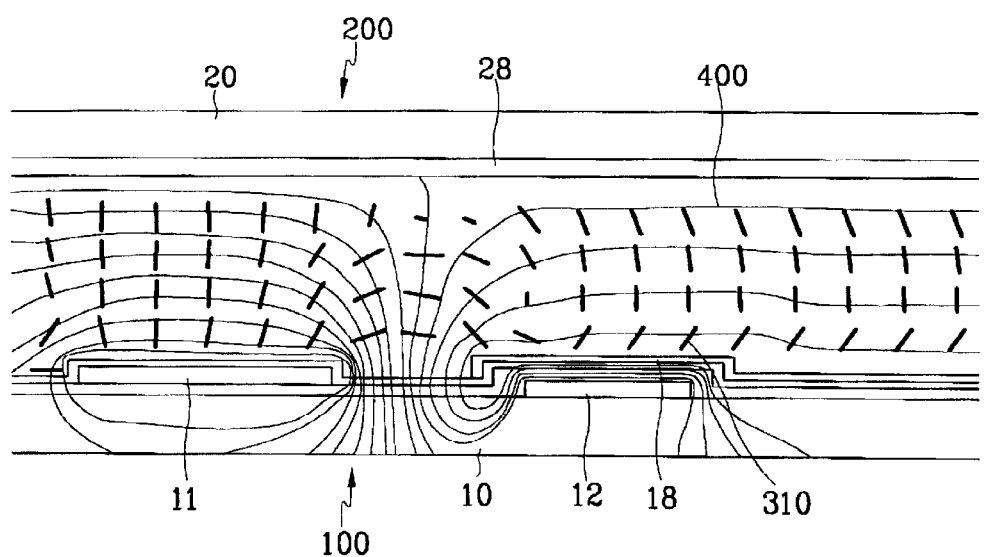

FIGS. 21A and 21B show schematic sectional views of a liquid crystal display having a bent alignment of liquid crystal molecules according to a tenth preferred embodiment of the present invention. Most of the structure of the tenth embodiment is identical to that of the previous embodiments. Accordingly, only different aspects will be described and like reference numerals will be used for like parts.

An opaque layer 12 is formed on the lower substrate 10 in area A, that is, at an edge portion of the unit pixel. The opaque layer 12 blocks light that is leaked as a result of the broken alignment of the liquid crystal molecules. It is preferable that the edge of the pixel electrode 18 is positioned between the wiring 11 and the opaque layer 12. This is because the broken bent alignment of the liquid crystal molecules 310 occurs in area A by the formation of the bent electric field between the wiring 11 and the opaque layer 12 at the edge of the pixel electrode 18, thereby resulting in the leakage of light in this area. The opaque layer 12 may be formed on the same layer as the gate lines, and can be used as a storage electrode by overlapping the pixel electrode 18.

In the present invention structured and operating as in the above, the broken bent alignment of the liquid crystal molecules is minimized through various methods.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display, comprising:
a first substrate including wiring that intersects to define unit pixels, and a first electrode provided in each of the unit pixels;
a second substrate opposing the first substrate and including a second electrode formed over an entire area of the second substrate, the first and second electrodes forming an electric field when a voltage is applied to the first and second electrodes;
a liquid crystal layer formed by injecting liquid crystal material between the first and second substrates, the liquid crystal material being comprised of liquid crystal molecules that are horizontally oriented in one direction and increasingly bent as approaching an imaginary center plane, wherein the center plane is parallel and equidistant to the first and second substrates, when the electric field is formed between the first and second substrates, thereby being symmetrical about the center plane; and
a buffer electrode provided under the first electrode and extending past an edge of the first electrode at an area where orientation of the liquid crystal molecules begins in the unit pixel.

2. The liquid crystal display of claim 1, wherein the wiring includes gate lines for transmitting gate signals and data lines for transmitting image signals, wherein the data lines cross the gate lines.

3. The liquid crystal display of claim 2, wherein the first substrate further includes thin film transistors formed at regions where the gate lines and the data lines cross, the thin film transistors having gate electrodes connected to the gate lines, source electrodes connected to the data lines, drain electrodes provided opposite the source electrodes with reference to the gate electrodes, and a semiconductor layer.

4. The liquid crystal display of claim 1, wherein the buffer electrode is formed on a same layer as the wiring.

5. The liquid crystal display of claim 1, wherein the buffer electrode is electrically connected to the first electrode.

6. The liquid crystal display of claim 1, wherein the buffer electrode is formed in line with the wiring.

7. A liquid crystal display, comprising:
a first substrate including wiring that intersects to define unit pixels, and a first electrode provided in each of the unit pixels;
a second substrate opposing the first substrate and including a second electrode formed over an entire area of the second substrate, the first and second electrodes forming an electric field when a voltage is applied to the first and second electrodes; and
a liquid crystal layer formed by injecting liquid crystal material between the first and second substrates, the liquid crystal material being comprised of liquid crystal molecules that are horizontally oriented in one direction and increasingly bent as approaching an imaginary center plane, wherein the center plane is parallel and equidistant to the first and second substrates, when the electric field is formed between the first and second substrates, thereby being symmetrical about the center plane,
wherein an aperture is formed in either the first electrode or the second electrode in an area where orientation of the liquid crystal molecules begins in the unit pixels.

8. The liquid crystal display of claim 7, further comprising a buffer electrode provided under the first electrode and extending past an edge of the first electrode at an area where orientation of the liquid crystal molecules begins in the unit pixel.

9. The liquid crystal display of claim 8, wherein the edge of the first electrode under which the buffer electrode is provided is the edge closest to a center of the second electrode.

10. The liquid crystal display of claim 9, wherein the aperture and the buffer electrode are in line with the wiring.

11. The liquid crystal display of claim 7, wherein the wiring includes gate lines for transmitting gate signals and data lines for transmitting image signals, wherein the data lines cross the gate lines.

12. The liquid crystal display of claim 11, wherein the first substrate further includes thin film transistors formed at regions where the gate lines and the data lines cross, the thin film transistors having gate electrodes connected to the gate lines, source electrodes connected to the data lines, drain electrodes provided opposite the source electrodes with reference to the gate electrodes, and a semiconductor layer.

13. The liquid crystal display of claim 10, wherein the buffer electrode is formed on a same layer as the wiring.

14. The liquid crystal display of claim 13, wherein the buffer electrode is electrically connected to the first electrode.

15. The liquid crystal display of claim 7, wherein an edge of the aperture closest to the center of the unit pixel is provided over the first electrode when the aperture is formed in the second electrode.

16. A liquid crystal display, comprising:
a first substrate including wiring that intersects to define unit pixels, and a first electrode provided in each of the unit pixels;
a second substrate opposing the first substrate and including a second electrode formed over an entire area of the second substrate, the first and second electrodes forming an electric field when a voltage is applied to the first and second electrodes, and also including a black matrix formed in the unit pixel and having an aperture; and
a liquid crystal layer formed by injecting liquid crystal material between the first and second substrates, the liquid crystal material being comprised of liquid crystal molecules that are horizontally oriented in one direction and increasingly bent as approaching an imaginary center plane, wherein the center plane is parallel and equidistant to the first and second substrates, when the electric field is formed between the first and second substrates, thereby being symmetrical about the center plane,
wherein a pretilt angle of the liquid crystal molecules in a first region of the first electrode that corresponds to the unit pixel is different from that of a second region of the first electrode that corresponds to the wiring or the black matrix.

17. The liquid crystal display of claim 16, wherein the pretilt angle of the first region is smaller than the pretilt angle of the second region.

18. A method for manufacturing a liquid crystal display, comprising steps of:
producing a first substrate including wiring that intersects to define unit pixels, and a first electrode provided in each of the unit pixels;
producing a second substrate including a second electrode formed over an entire area of the second substrate, the first and second electrodes forming an electric field when a voltage is applied to the first and second electrodes, and also including a black matrix formed in the unit pixel and having an aperture;

performing a first orientation process in the same direction on the first and second substrates such that liquid crystal molecules of liquid crystal material to be provided between the substrates have a particular pretilt angle;

aligning and connecting the first and second substrates such that a predetermined gap is formed therebetween; and performing a second orientation process using the black matrix as mask such that the liquid crystal molecules have a different pretilt angle in a first region corresponding to the wiring or black matrix and in a second region corresponding to the unit pixel.

19. The method of claim 18, wherein the second orientation process is performed by irradiating light while using the wiring or black matrix as a mask.

20. The method of claim 19, wherein the pretilt angle of the second region is smaller than the pretilt angle of the first region.

21. A liquid crystal display, comprising:

a first substrate including wiring that intersects to define unit pixels, and a first electrode provided in each of the unit pixels;

a second substrate opposing the first substrate and including a second electrode formed over an entire area of the second substrate, the first and second electrodes forming an electric field with a voltage is applied to the first and second electrodes;

a protrusion pattern in each unit pixel covering an edge of the first electrode where orientation of the liquid crystal molecules starts; and a liquid crystal layer formed by injecting liquid crystal material injected between the first and second substrates, the liquid crystal material being comprised of liquid crystal molecules that are horizontally oriented in one direction and increasingly bent as approaching an imaginary center plane, wherein the center plane is parallel and equidistant to the first and second substrates, when the electric field is formed between the first and second substrates, thereby being symmetrical about the center plane, wherein a pretilt angle of the liquid crystal molecules is in the range of 10–25°.

22. The liquid crystal display of claim 21, wherein the protrusion pattern has an anisotropy of between 3 and 7.

23. The liquid crystal display of claim 21, wherein the wiring includes gate lines for transmitting gate signals and data lines for transmitting image signals, wherein the data lines cross the gate lines.

24. The liquid crystal display of claim 23, wherein an orientation direction of the liquid crystal molecules is parallel to the data lines or the gate lines.

25. The liquid crystal display of claim 21, further comprising a layer for blocking light, the layer being formed under the first electrode where orientation of the liquid crystal molecules starts in the unit pixels.

26. The liquid crystal display of claim 23, wherein the layer for blocking light is formed on a same layer as the gate lines.

27. The liquid crystal display of claim 25, wherein the layer for blocking light is formed on a same layer s the gate lines.

28. The liquid crystal display of claim 26, wherein the layer for blocking light overlaps the first electrode to form a storage capacitance.

* * * * *